(12) United States Patent
Nollet et al.

(10) Patent No.: US 9,038,072 B2
(45) Date of Patent: May 19, 2015

(54) SYSTEM AND METHOD FOR HARDWARE-SOFTWARE MULTITASKING ON A RECONFIGURABLE COMPUTING PLATFORM

(75) Inventors: Vincent Nollet, Mechelen (BE); Paul Coene, Grobbendonk (BE); Jean-Yves Mignolet, Berloz (BE); Serge Vernalde, Leuven (BE); Diederik Verkest, Tielt-Winge (BE); Theodore Marescaux, Leuven (BE); Andrei Bartic, Iasi (RO)

(73) Assignee: XILINX, INC., San Jose, CA (US)

( * ) Notice: Subject to any disclaimer, the term of this patent is extended or adjusted under 35 U.S.C. 154(b) by 1243 days.

(21) Appl. No.: 12/332,281

(22) Filed: Dec. 10, 2008

(65) Prior Publication Data

US 2009/0187756 A1 Jul. 23, 2009

Related U.S. Application Data

(63) Continuation of application No. 10/453,899, filed on Jun. 2, 2003, now abandoned.

(60) Provisional application No. 60/384,881, filed on May 31, 2002.

(51) Int. Cl.
*G06F 9/46* (2006.01)
*G06F 1/24* (2006.01)
*G06F 15/78* (2006.01)

(52) U.S. Cl.
CPC .................... *G06F 15/7867* (2013.01)

(58) Field of Classification Search
None
See application file for complete search history.

(56) References Cited

U.S. PATENT DOCUMENTS

| | | | |
|---|---|---|---|
| 5,613,129 A | 3/1997 | Walsh | |
| 5,784,636 A * | 7/1998 | Rupp | 712/37 |
| 6,233,540 B1 | 5/2001 | Schaumont et al. | |
| 6,539,438 B1 * | 3/2003 | Ledzius et al. | 710/8 |
| 6,789,214 B1 * | 9/2004 | De Bonis-Hamelin et al. | 714/15 |
| 8,020,163 B2 * | 9/2011 | Nollet et al. | 718/104 |

(Continued)

FOREIGN PATENT DOCUMENTS

| | | |
|---|---|---|
| EP | 1022654 | 7/2000 |
| EP | 1168168 | 1/2002 |

OTHER PUBLICATIONS

Office Action dated Jul. 5, 2007 from U.S. Appl. No. 10/453,899.

(Continued)

*Primary Examiner* — Kenneth Tang
(74) *Attorney, Agent, or Firm* — Knobbe Martens Olson & Bear; LeRoy D. Maunu

(57) ABSTRACT

A platform supporting reconfigurable computing, enabling the introduction of reconfigurable hardware into portable devices is described. Dynamic hardware/software multitasking methods for a reconfigurable computing platform including reconfigurable hardware devices such as gate arrays, especially FPGA's, and software, such as dedicated hardware/software operating systems and middleware, adapted for supporting the methods, especially multitasking, are described. A computing platform, which is a heterogeneous multi-processor platform, containing one or more instruction set processors (ISP) and a reconfigurable matrix (for instance a gate array, especially an FPGA), adapted for (dynamic) hardware/software multitasking is described.

28 Claims, 16 Drawing Sheets

(56) References Cited

U.S. PATENT DOCUMENTS

2001/0047465 A1   11/2001   Liu
2005/0203988 A1    9/2005   Nollet et al.

OTHER PUBLICATIONS

Amendment dated Dec. 5, 2007 from U.S. Appl. No. 10/453,899.
Final Office Action dated Jul. 10, 2008 from U.S. Appl. No. 10/453,899.
Brebner, Gordon, "The Swappable Logic Unit: a Paradigm for Virtual Hardware," *Proc. of the 5th Annual IEEE Symposium on Field-Programmable Custom Computing Machines*, Apr. 16, 1997, pp. 77-86, IEEE, Piscataway, New Jersey, USA.
Diessel, Oliver et al., *Oppurtunities for Operating Systems Research in Reconfigurable Computing*, 1999, pp. 1-12, http://www.cse.unsw.edu.au/~odiessel/papers/unisa99018diessel.pdf, retrieved from Internet Jul. 14, 2011.
Simmler, H. et al., "Multitasking on FPGA Coprocessors," *Proc. of The Roadmap to Reconfigurable Computing, 10th International Workshop on Field-Programmable Logic and Applications*, Aug. 27, 2000, pp. 121-130, Springer-Verlag, London, UK.

\* cited by examiner

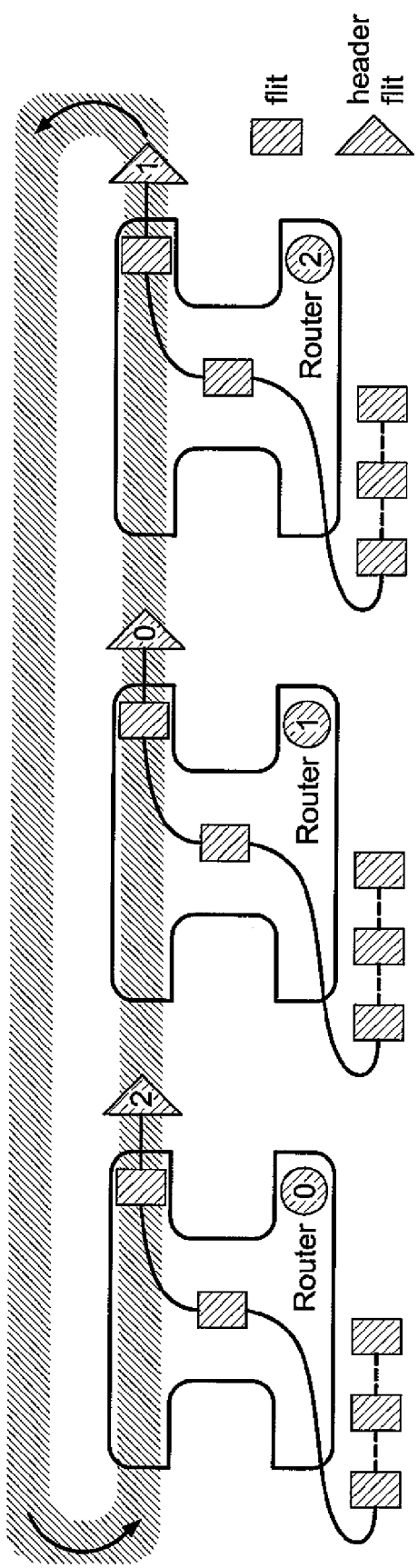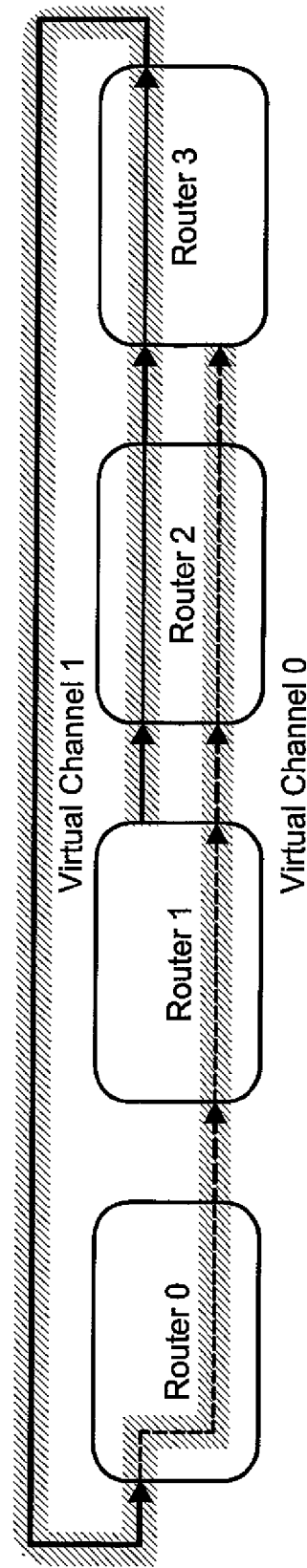
FIG. 8A
FIG. 8B

SYSTEM AND METHOD FOR HARDWARE-SOFTWARE MULTITASKING ON A RECONFIGURABLE COMPUTING PLATFORM

RELATED APPLICATIONS

This application claims priority, as a continuation application, to U.S. application Ser. No. 10/453,899 filed Jun. 2, 2003, which claims priority under 35 U.S.C. §119(e) from provisional application No. 60/384,881 filed May 31, 2002, which is hereby incorporated by reference.

BACKGROUND OF THE INVENTION

1. Field of the Invention

The invention relates to multitasking computing systems and methods adapted for reconfigurable computing platforms as well as reconfigurable hardware devices and software, such as operating systems, middleware, or drivers adapted for supporting and executing the methods.

2. Description of the Related Technology

Nowadays a lot of applications, like multimedia applications are emerging on portable appliances. These applications require both the flexibility of upgradeable devices (typically software based) and a powerful computing engine (typically hardware). This application domain is therefore a very good target for reconfigurable computing.

Execution of applications on a software based computing platform is often supported by an operating system (OS), that abstracts the hardware, by providing a clear interface to the facilities of the platform. Operating systems for a general purpose programmable processor are known. The OS can also provide an environment where several tasks can run concurrently, with a minimal of interference between them, but with support for safe data sharing. In that context, the OS should manage the available hardware resources in a consistent, efficient and fair way. Operating systems for combinations of general purpose programmable processors, enabling such multitasking, are also known. Many contemporary platforms have a general purpose OS that abstracts the hardware. These operating systems, however, do not provide any support for incorporating hard real time properties into tasks.

Running of applications on a dedicated hardware device can involve writing a device driver, allowing applications to communicate with this device. Such a-device driver-only approach makes an application designer responsible for the execution of the application, instead of the OS. Such a device driver is device and application specific.

In case multiple resources are available on a computing platform, a scheduling problem can be defined as follows. Since the computing resources are limited: how to decide what task to run and where, in case there are multiple processors or processing engines available. These decisions can be based on parameters like task priority, processor affinity. In case of pre-emptive scheduling: how can the context of the current task be saved, in order for this task to continue whenever additional computing resources are assigned to it. The existing work in the area of runtime reconfigurable systems concentrates on managing the time evolution of applications that exclusively own the reconfigurable matrix for a short while. A lot of work has already been done on describing general concepts about scheduling tasks on heterogeneous multi-processor systems, as well as specific scheduling techniques.

Multi-processor architectures include interconnection networks. Various interconnection networks are known in the multicomputing world and System-on-Chip. A packet-switched network for instance exists in different flavors, both for the topology (k-ary n-cubes, hypercubes, butterflies, crossbars) and for the type of routing (wormhole, virtual cut-through, mad postman switching). Such a concept has been introduced in SoC, allowing to route packets instead of wires.

SUMMARY OF CERTAIN INVENTIVE ASPECTS OF THE INVENTION

One aspect of the invention provides an improved computing platform, methods of operating the same, software such as an operating system, middleware and device drivers as well as reconfigurable hardware devices which are more flexible in their use of resources.

Another aspect of the invention presents in general the platform supporting reconfigurable computing, enabling the introduction of reconfigurable hardware into portable devices.

Another aspect of the invention provides dynamic hardware/software multitasking methods for a reconfigurable computing platform including reconfigurable hardware devices such as gate arrays, especially FPGA's, and software means, like dedicated hardware/software operating systems and middleware, adapted for supporting the methods, especially multitasking.

It is another aspect of the invention to provide a platform, which is a heterogeneous multi-processor platform, containing one or more instruction set processors (ISP) and a reconfigurable matrix (for instance a gate array, especially an FPGA), adapted for (dynamic) hardware/software multitasking.

It is another aspect of the invention to provide an operating system (OS), capable of dealing with the platform, by providing a clear interface to the facilities of the platform and supporting concurrent task execution. The operating system is preferably an application independent system, allowing applications with a plurality of tasks, to communicate to the heterogeneous platform. Application tasks mapped on the reconfigurable matrix are denoted as hardware (HW) tasks (or components) while other tasks are denoted software (SW) tasks or components, e.g. for running on an Instruction Set Processor (ISP). The operating system is denoted a HW/SW OS. Facilities for invoking hard real time constraints on a SW task are included in the operating system. Means for storing state information of a task pre-empted on a reconfigurable device is provided. The storage and transfer/restoration of state information can be managed by a HW/SW OS scheduler.

It is another aspect of the invention to provide an abstraction layer, in the form of device driver, between the reconfigurable matrix and the operating system (HW/SW OS). The application communicates to the HW/SW OS, which in turn communicates with the device driver. The device driver deals with the reconfigurable matrix. Essentially there is no direct communication between the application and this device driver. The device driver, that abstracts the reconfigurable matrix away from the HW/SW OS, can handle the problem of where to place the HW tasks in the reconfigurable matrix.

A further aspect of the invention is the provision of an interconnection network on the reconfigurable matrix.

Another aspect of the invention provides a method for execution of an application or a plurality of applications, the execution requiring running substantially simultaneously a plurality of tasks (multi-tasking), on the platform. The execution method allows for dynamically instantiation of HW tasks by exploiting partial reconfiguration of the reconfigurable matrix, for a low hardware overhead. The reconfigurable matrix can be subdivided into smaller processing units or "tiles". The tiles of the reconfigurable matrix are reconfigurable, hence fine-grain configurability is exploited. The tiles may be suitable for a dedicated hardware task or may be a microcontroller. The method opens the way to a new class of hybrid applications dynamically mixing hardware and software components.

It is another aspect of the invention to provide means to (re)schedule a task either in hardware or software in a reconfigurable system-on-chip, provided with a uniform communication scheme, more in particular tools incorporated within a suitable object-oriented design environment permitting the implementation and management of hardware/software relocatable tasks. The above means enable development of applications in a way that ensures an equivalent behavior for hardware and software implementations to allow run-time relocation and equivalence of states between hardware and software for enabling efficient heterogeneous context switches. Full hardware/software multitasking is realized, in such a way that the operating system is able to spawn and relocate a task either in hardware or software.

Another aspect of the invention provides a method of dynamically reconfiguring a computing platform in a process for executing at least one application on the platform, the platform comprising at least one programmable processor and a reconfigurable processing device, the application comprising a plurality of tasks, a number of the tasks being selectably executable as a software task on a programmable processor or as a hardware task on a hardware device, the method comprising: configuring the reconfigurable device so as to be capable of executing a first plurality of hardware tasks; after the configuring, executing a first set of tasks of an application substantially simultaneously on the platform, at least two of the tasks of the first set being substantially simultaneously executed as hardware tasks of the first plurality on the reconfigurable device; interrupting the execution of the first set; configuring the reconfigurable device such that at least one new hardware task other than one of the first plurality of hardware tasks can be executed; executing a second set of the tasks to further execute the application, the second set including the new hardware task, the execution being substantially simultaneously on the platform, at least two of the tasks of the second set, including the new hardware task, being substantially simultaneously executed as hardware tasks on the reconfigurable device.

The configuring of the reconfigurable device is preferably carried out at run-time of the application. The configuring of the reconfigurable device is preferably transparent to a user running the application. The hardware tasks can be written in a description language and the hardware tasks written in the description language can be automatically converted into a hardware bitstream description. Preferably, the reconfigurable device, comprises a plurality of tiles, each tile being configurable in a variety of configurations, each of the tile configurations being capable of running a hardware task and wherein the configuring of the reconfigurable device such that the at least one new hardware task other than the first plurality of hardware tasks can be executed, changes at least one of the tiles from one configuration to another configuration.

The reconfigurable device can comprise a plurality of tiles and a communication network for providing communication between the tiles, wherein while the configuring of the reconfigurable device is carried out such that at least one new hardware component other than the hardware components of the first list can be executed, the communication network remains fixed.

In the method a new task can be first executed on the programmable processor and thereafter, when the configuring is ready, executing the second set of the tasks, including the new task, substantially simultaneously on the platform, while at least two of the tasks of the second set, including the new task, are substantially simultaneously executed as hardware tasks on the reconfigurable device.

A task is preferably described in a description using a description language being represented as a first set of objects with a first set of relationships therebetween. The description or a derivation thereof is then transformed into synthesizable code.

In one embodiment of the invention, the application can be represented by codes, of which at least a first part is convertible in a first code, obtainable by mapping at least part of the application onto a virtual device which is hardware reconfigurable. Further at least a second part of the code is convertible in a second code obtainable by mapping at least part of the application onto a virtual programmable processor, the first code comprising configuration information for hardware reconfiguring the virtual device, the hardware reconfiguring being required for enabling execution of the application on the virtual device, the second code comprising instructions compilable on a virtual programmable processor. The first code is transformed into a third code, the third code comprising configuration information for hardware configuring the hardware reconfigurable device, the hardware reconfiguring being required for enabling execution of the application on the hardware reconfigurable device. The second code is transformed into a fourth code, the fourth code comprising instructions compilable on the programmable processor. Finally, the application with the third and fourth code is executed on the device.

The application can also be defined as a set of process threads in a description language, the set defining a representation of the application, at least part of the process thread representing a process which can be carried out on either the reconfigurable hardware device or the programmable processor, the description language including a function that suspends a thread. Then, at least one thread is suspended the state information of the thread is stored by invoking the function.

Another aspect of the invention provides an operating system of a computing platform, capable of managing the execution of at least one application, comprising a plurality of tasks, a number of the tasks being selectably executable as a software task on a programmable processor or as a hardware task on a hardware device, on the computing platform comprising at least one programmable processor and a reconfigurable device. The operating system comprises means for scheduling the tasks and means for reconfiguring at run-time resources for a hardware task executed on the reconfigurable device. Means for allocating resources between the programmable processor and the reconfigurable device can also be provided. The operating system or another program can comprise means for pre-empting and relocating tasks between the programmable processor and the reconfigurable device and vice versa. Means for storing state information can be provided for a task executed as a hardware component, when preempted on the reconfigurable device.

The tasks can be capable of moving to a preemption state when receiving a pre-emption request, and means for sending a message containing the current state of that task can be provided, when the preemption state is reached for a task.

Also means for restoration of state information on the reconfigurable device, when the corresponding task's execution, is re-started can be provided.

Further, means for invoking hard real time constraints on a task executed as a software task can be provided. Means for supporting uniform communication, allowing tasks to send/receive messages regardless of whether they are executed as hardware or as software tasks can also be provided. The operating system can be adapted for handling logical addresses as representations of the tasks, and the means for supporting uniform communication can comprise means for updating address translation tables, enabling translation of the logical addresses into physical addresses, representing the location of a task within the reconfigurable device.

The operating system can be adapted for operating with a platform with a reconfigurable device comprising a plurality of tiles, each tile being configurable in a variety of configurations, each of the tile configurations being capable of running a hardware component, as well as means for storing the usage of tiles by the hardware components at any moment. The operating system can further comprise means for deciding on which tile a hardware task is executed. Means for adapting the configurations of the tiles by performing a partial reconfiguration of the reconfigurable device without rerouting can also be provided. The operating system may be for execution on the programmable processor in real-time mode. The operating system may be adapted to co-operate with means for operating system support, the means being adapted for execution on the reconfigurable device.

Another aspect of the invention also provides a piece of middleware software, the middle software comprising: means of communicating with the operating system described above, and means for performing the selection of whether a task will be selected as software or as hardware component. The middleware software may further comprise: means for handling a representation of the application as a set of communicating threads. The middleware software may further comprise: means for automatic code generation for a task either as hardware component or as software component.

The selection of whether a task will be selected as software or as hardware component can be based on determining a trade-off in terms of QoS.

Another aspect of the invention also provides a device driver, dedicated for a reconfigurable device configured to have a plurality of tiles. The device driver can comprise means for communicating with an operating system, the means for communicating providing the operating system with information about the number of tiles and the speed of reconfigurability of the reconfigurable device.

Another aspect of the invention may provide a reconfigurable device comprising a plurality of tiles and a communication network for providing communication between the tiles, as well as means for message routing over the communication network. The messaging may be provided by routing tables.

Another aspect of the invention also provides a communication network, configured on a reconfigurable device, the reconfiguration being configured to have a plurality of tiles, the communication network providing communication between the tiles. The communication network can be adapted for supporting packet-switched interconnection network, in particular, for supporting message passing communication between tasks, executed by the tiles. The communication network may have multiple time-multiplexed virtual channels. The communication network can have a torus-like 2-D network topology, and can be adapted for supporting wormhole routing, for instance. The communication network may comprise a plurality of routers. Interfaces, for decoupling the tasks from the network may be provided. The interfaces may include double port memories. The network clock rate may be substantially higher than the tile clock rate.

Another aspect of the invention provides a multi-tasking reconfigurable device, comprising: a plurality of tiles, each tile being configurable in a variety of configurations, each of the tile configurations being capable of running a hardware task, each of the tile configurations having an interface, wherein the position of the interfaces is constant. The tiles can be separately configurable. The input/output topology of each of the configurations of a single title can be identical. The reconfigurable device may comprise a plurality of configurable logic blocks (CLB's); the CLB's being arranged in an array wherein respective CLB's are placed edge to edge in a tiled arrangement, thereby defining the tiles. A routing structure for interconnecting the configurable logic blocks (CLB's) may be provided. A communication network defined on the routing structure for providing communication between the tiles can also be provided. The communication network can comprise a plurality of routers. The communication network may be implemented in an ON-CHIP packet-switched interconnection network. Each of the tiles can define partly a virtual processor. Each of the titles may define partly a local memory to which the virtual processor has direct access without passing the routers or routing resources.

Another aspect of the invention also provides a method for reconfiguring a reconfigurable hardware device having tiles such that a set of hardware tasks the device is capable to run is changed, the method comprising reconfiguring one of the tiles from a first configuration, capable of running a first task, into a second different configuration, capable of running a second different task; the reconfiguring of the one tile being such that the interface of the second configuration satisfies the interface position constraints.

BRIEF DESCRIPTION OF THE DRAWINGS

FIG. 8 shows a process flow for flits on for two virtual channels in accordance with an embodiment of the invention.

DETAILED DESCRIPTION OF CERTAIN EMBODIMENTS OF THE INVENTION

Figure 1:
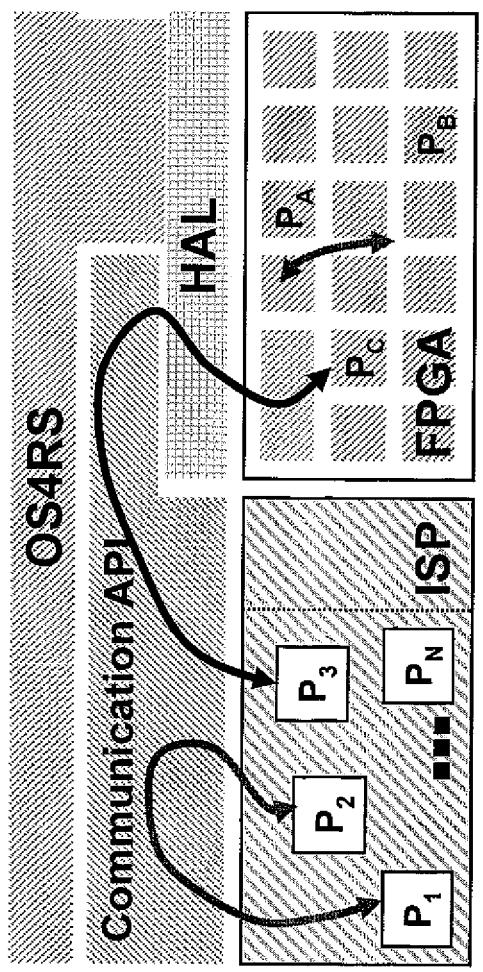
FIG. 1 represents a block diagram of an embodiment of a hybrid computing platform in accordance with the invention.

The invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

One aspect of the invention relates to an apparatus or environment, capable of performing multi-tasking, to multi-tasking methods, to an operating system that supports the methods and runs on the apparatus or parts of such an apparatus.

In one embodiment, the apparatus is capable of executing at least one application, composed of a plurality of tasks. These tasks may execute as threads. At least a number of the tasks are selectably executable as software components or tasks, meaning executable on a programmable processor, and as hardware components or tasks, meaning executable on a dedicated datapath or on a microcontroller or similar.

In this embodiment, the apparatus comprises a plurality of resources, more in particular at least of one programmable processor and a reconfigurable hardware device, meaning capable of being reconfigured in various datapaths, suited for executing the hardware components or tasks.

A reconfigurable hardware device, comprises typically a plurality of small configurable logic blocks and an interconnect structure for interconnecting the configurable logic blocks. A reconfigurable hardware device can be a logic gate array, e.g. a Field Programmable Gate Array (FPGA). Reconfiguring the hardware device means changing the configuration or function of the logic blocks and/or the interconnection between the configurable logic blocks. As the reconfiguration works at the level of these relatively small configurable logic blocks, this type of reconfigurability is denoted fine grain reconfigurability.

One aspect of the invention relates to a method of using such a reconfigurable hardware device, the method being particularly adapted for multi-tasking. Fine grain reconfigurability allows for changing all configurable logic blocks and their interconnects but requires a full place-and-route operation. In one aspect the invented method restricts the degree's of freedom in reconfiguring while retaining the necessary flexibility for enabling the hardware device to execute a hardware component or task. This is realized by arranging the configurable logic blocks in various groups, typically in an array, wherein respective blocks are placed edge-to-edge in a tiled arrangement, thereby defining so-called tiles.

A tile can thus be defined as a plurality of near-by or neighboring configurable logic blocks. The tile size can be selected such that a title is configurable in a variety of configurations, each of the title configurations being capable of running a hardware component or task. In order to avoid full place-and-route operations, each of the tile configurations has an interface, with the position of the interfaces within the hardware device being predetermined. A multi-tasking method in accordance with an embodiment of the invention, executed on an apparatus incorporating a reconfigurable hardware device, reconfigures the hardware device, by selecting configurations from the predetermined configurations of the tiles. Such a method can modify the functionality of the hardware reconfigurable device (hence such that the set of hardware tasks the device is capable to run is changed) by reconfiguring at least one of the tiles from a first configuration, capable of running a first task, into a second (different) configuration, capable of running a second (different) task. Further, the reconfiguring of the one tile can be such that the interface of the second configuration satisfies the interface position constraints.

Another aspect of the invention provides an operating system, or at least extensions for a traditional operating system, for a reconfigurable system, capable of managing tasks (of one or more applications) over the different resources of an apparatus, having at least one reconfigurable hardware logic device, enabling handling of tasks, executable as hardware component, also denoted a hardware task. The operating system schedules tasks, both on a programmable processor such as an Instruction Set Processor (ISP) and on the reconfigurable logic device and supports a uniform communication framework, which allows tasks to send/receive messages, regardless of their execution location.

Another aspect of the invention provides a middle layer system or middleware running on top of the operating system, taking the application as input and deciding on the partitioning of the tasks between the reconfigurable hardware device and the software-based programmable processor. The partitioning is preferably based on quality of service considerations.

In one embodiment of the invention, a method of reconfiguring the apparatus provides communication while the tasks are executed. Therefore, on the reconfigurable hardware device a communication network such as an interconnection network or arrangement for routing resources is defined on the routing structure, defined for the configurable logic blocks, for providing communication between the tiles.

In an embodiment the inter-task communication is based on message passing. Messages are transferred from one task to another in a common format for both hardware and software tasks. Both the operating system and the hardware architecture should therefore support this kind of communication.

In one embodiment, the operating system provides means for updating address translation tables, to be used whenever the operating system schedules a task, represented by a logical address, in hardware. This address translation table allows the operating system to translate a logical address into a physical address and vice versa. The assigned physical address is based on the location of the task in the interconnection network. The operating system can further provide a message passing API, which uses these logical/physical addresses to route the messages.

In one embodiment, the operating system is aware of the tile usage at any moment. As a consequence, it can spawn a new task without placement overhead by replacing the tile content through partial reconfiguration of the FPGA.

The hardware architecture can provide the necessary support for message passing. Messages between tasks, both scheduled in hardware, can be routed inside the interconnection network. Nevertheless, since the operating system can control the task placement, it also controls the way the messages are routed inside the network, by adjusting the hardware task routing tables. A packet-switched interconnection network can be provided to handle hardware management issues such as task placement, location independence, routing, and inter-task communication. Task placement is the problem of positioning a task somewhere in the reconfigurable hardware fabric by executing a placement algorithm but with a constraint to fit the task in the shape of a tile. Run-time task placement is therefore enabled and greatly facilitated, since every tile has the same size and same shape.

The run-time routing provided by one embodiment of the invention can be described as providing connectivity between the newly placed task and the rest of the system. The provided communication infrastructure, implemented at design-time inside the interconnection network, provides the new task with a fixed communication interface, based on routing tables. Once again, the operating system preferably does not run any complex algorithm. Its only action is updating the routing tables every time a new task is inserted/removed from the reconfigurable hardware.

In one embodiment, the design of relocatable tasks is provided as a common behavior for the HW and the SW implementation of a task. One embodiment of the invention provides for a unified representation that can be refined to both hardware and software. Consider a C++ library that allows unified hardware/software system design, by allowing a designer to make a representation of an application as communicating threads. The objects contain timing information, allowing cycle-true simulation of the system. Once the system is designed, automatic code generation for both hardware and software is available. This ensures a uniform behavior for both implementations in the heterogeneous reconfigurable system.

Through the use of the foreign language interface features, an interface is provided that represents the communication with the other tasks. This interface provides functions like send_message and receive_message that will afterwards be expanded to the corresponding hardware or software implementation code. This ensures a communication scheme that is common to both implementations.

Methods in accordance with one aspect of the invention provide for spatial multitasking in hardware, in contrast to the time-based multitasking. Since the number of tiles is limited, the operating is forced to decide at run-time on the allocation of resources, in order to achieve maximum performance. Consequently, the operating system has means to pre-empt and relocate tasks from the reconfigurable logic to the ISP and vice versa.

ISP registers and a task memory completely describe the state of any task running on the ISP. Consequently, the state of a preempted task can be fully saved by pushing all the ISP registers onto a task stack. Whenever the task gets rescheduled at the ISP, simply popping the register values from its stack and initializing the registers with these values restores its state. This approach is not necessarily usable for a hardware task, since a hardware device can depict its state in a completely different way. For example, state information can be held in several registers, latches and internal memory, in a way that is very specific for a given task implementation. In a such a design there is no simple, universal state representation, as for tasks executing on the ISP. Nevertheless, in one embodiment of the invention the operating system extracts and restores the state of a task executing in hardware, since this is a key issue when enabling heterogeneous context switches.

A way to extract and restore state when dealing with tasks executing on the reconfigurable logic can be achieved by extracting all status information bits out of the read back bitstream. This way, manipulation of the configuration bitstream allows re-initializing the hardware task. When adopting this methodology to enable heterogeneous context switches, one embodiment of the invention provides a translation layer in the operating system, allowing it to translate an ISP type state into FPGA state bits and vice versa. Furthermore, with this technique, the exact position of all the configuration bits in the bitstream must be known. However, it is clear that this kind of approach does not produce a universally applicable solution for storing/restoring task state.

In one embodiment, the invention provides a high level abstraction of the task state information. In this way the operating system is able to dynamically reschedule a task from the ISP to the reconfigurable logic and vice versa.

One embodiment of the invention enables reconfigurable computing, e.g. the ability to execute a variety of computational functions on the same computing platform, by changing the computation capabilities of the platform, in a dynamic way, meaning at run-time. When executing an application the reconfigurable platform functions however as if it were a fixed hardware programmable processor, i.e. the reconfiguration remains transparent to a user of the system.

Another aspect of the invention exploits the fine-grain architecture of the platform, meaning the ability to change the function of each of the logic blocks on the one hand but introduces a coarse grain onto the platform for enabling the run-time approach, e.g. by reconfiguring groups of logic blocks or tiles of the reconfigurable device.

Another aspect of the invention exploits the reconfiguration properties of the platform, more in particular the partial reconfiguration capabilities while avoiding rerouting. This is done by imposing restrictions in the configurations allowed on the platform. The restriction invokes the presence of computing blocks larger than the logic blocks of which the platform comprises but smaller than the platform itself. The computing blocks are communicating via an interconnection network. The network can also partly comprise logic blocks.

Another aspect of the invention provides an operating system performing the scheduling control for multitasking, dynamic task creation and deletion and task swapping. A communication semantic, called message passing, suited for both HW and SW tasks, is presented. The message passing can be used instead of fixed wiring. Decisions on a network topology and routing strategy, keeping the communication overhead in terms of area (e.g. the routing controller) and timing low, are also provided. In one embodiment of the invention, the network is preferably designed in order to prevent deadlocks and guarantee communication within a given time frame, although no fixed route/wire is available. Important for allowing task and the involved context switching in such a HW/SW multitasking platform is the capability of having a uniform state representation, for both a HW and SW task. By providing a high-level description of a task, the description being capable of being mapped to both a HW or SW task, allows the indication by the task developer to indicate the important state variables. The operating system has means for saving/accessing the state of a task when a task swapping is performed. Method for transforming high-level task descriptions, for instance using single threaded code, like in C or C++, into multi-threaded descriptions, like dynamic dataflow models, are suitable.

Figure 16:
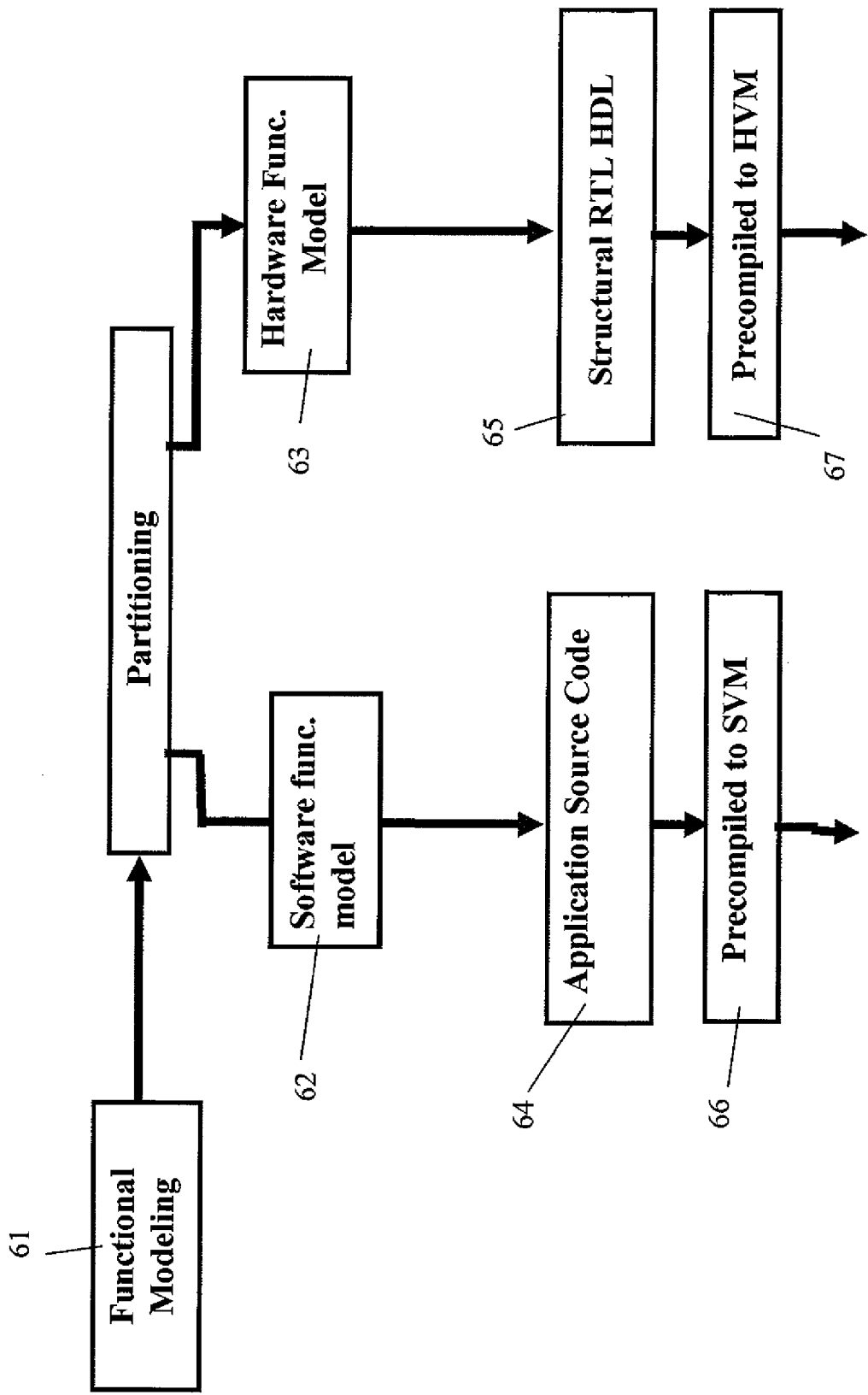
FIGS. 16 and 17 show a process flow in accordance with an embodiment of the invention.

In an embodiment of the invention, at a first stage, the application is represented by a functional model as shown in FIG. 16. This functional model 61 is optionally partitioned at into two sub-models 62, 63. The partitioning can be done at run time. One optional sub-model 62 describes the application software part. The other model 63 describes the application hardware part. An application source code 64 of an application software part is then run-time precompiled (e.g. on-the-fly compiling) 66 into a software bytecode 68 by a software virtual machine precompiler. The precompiler operates at run time, e.g. on-the-fly compiling. The hardware sub-model 63 is written in a description language and is fed into an automatic hardware code generation environment such as described in U.S. Pat. No. 6,233,540. The hardware sub model 63 is transformed at run time into a structural register transfer level (RTL) hardware description 65. The hardware design environment can be depicted as a hardware virtual machine precompiler 67 (e.g. for run-time compiling, such as on-the-fly compiling), generating abstract hardware bytecode as described in EP 1,168,168 which is incorporated herein by reference.

Figure 17:
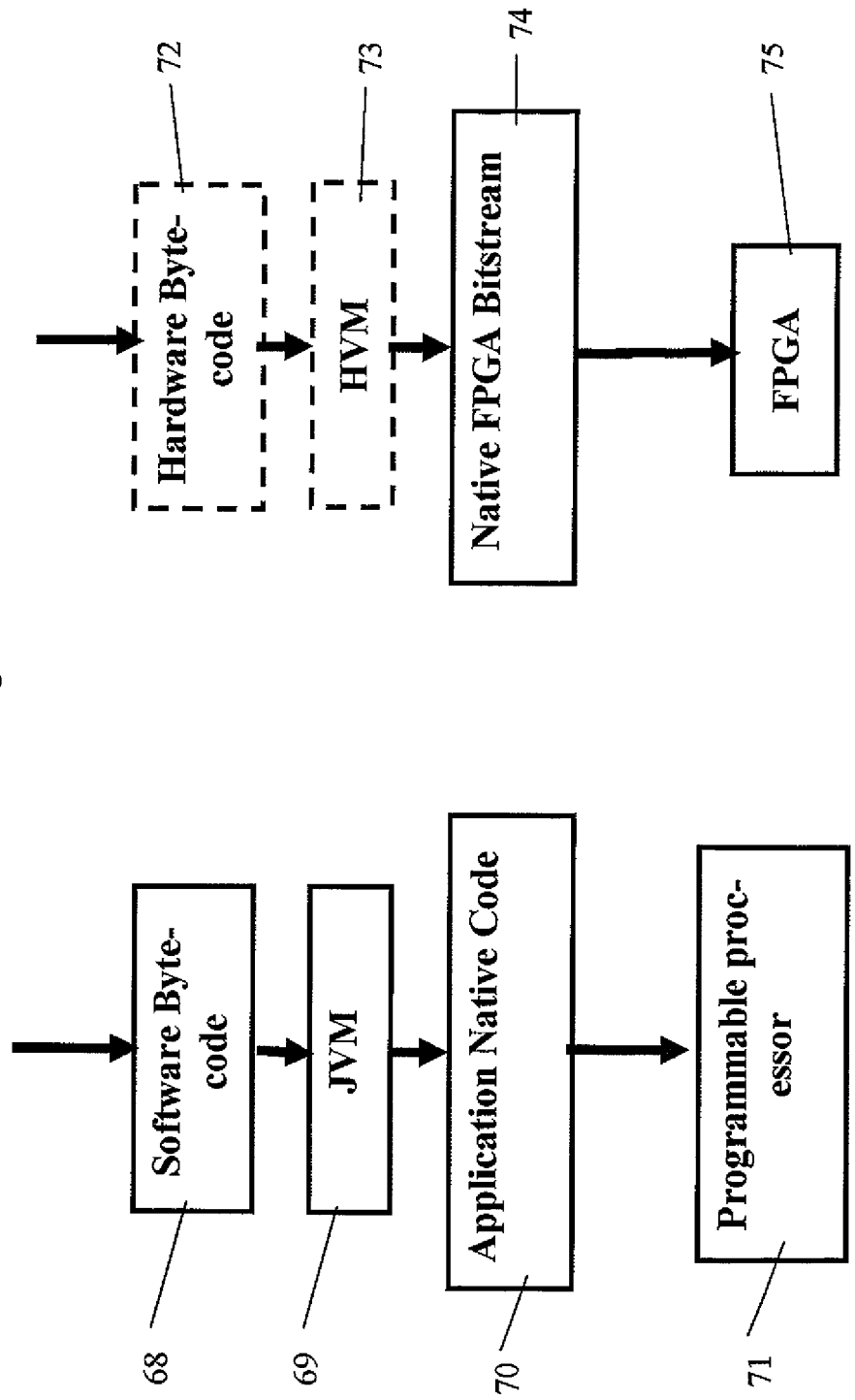

The software bytecode 68 is interpreted by the software virtual machine (SVM) 69, and turned into native application software code 70 that runs on the native CPU of a programmable processor 71, e.g. an ISP as shown in FIG. 17. On the other hand, the hardware bytecode 72 is interpreted by the hardware virtual machine (HVM) 73, and turned into native FPGA bitstreams 74 that will configure the native FPGA 75.

In one embodiment of the invention, the methods and apparatus can be applied, for instance, to multimedia applications, e.g. on portable devices like a personal digital assistant (PDA) or a mobile phone, MP3 players, MPEG players, games and browsers. To achieve Quality of Service (QoS) required for these applications, one embodiment of the invention not only provides the flexibility of a programmable processor, as well as an improved computation power for a specific application domain but also allows improved flexibility, e.g. by use of a reconfigurable hardware device.

Another aspect of the invention is therefore a general-purpose computing platform that allows different applications to run, like multimedia applications, and that offers enough flexibility to download and execute future applications. This platform can be powerful, flexible, energy conscious and inexpensive. The reconfigurable platform is provided with a software environment that allows the same ease-of-programming as a general-purpose processor platform today. The invented platform is a combination of an instruction-set processor (ISP) with a reconfigurable hardware device. The introduction of the reconfigurable hardware device provides low power consumption for high computation power by its hardware characteristics on the one hand, and flexibility by its reconfiguration aspects on the other hand. The platform supports true hardware/software multitasking. At least one of the tasks can be run either on the ISP or on the reconfigurable hardware. An operating system manages the applications by distributing the different tasks on the available resources. The provided platform is thus a heterogeneous multi-processor platform, containing one or more instruction set processors (ISP) and one or more reconfigurable matrices (for instance a logic gate array, especially an FPGA).

It is another aspect of the invention to provide an operating system (OS), capable of dealing with the platform, by providing a clear interface to the facilities of the platform and to support concurrent task execution. In one embodiment, the operating system is an application independent system, allowing applications with a plurality of tasks, to communicate with the HW/SW platform. Application tasks mapped on the reconfigurable matrix are denoted hardware (HW) tasks while other tasks are denoted software (SW) tasks. The operating system is denoted a HW/SW OS. Facilities for invoking hard real time constraints on a SW task are included in the operating system. A technique for storing state information of a task preempted on a reconfigurable device is introduced. The storage and transfer/restoration of state information is managed by the HW/SW OS scheduler. The OS allows incorporation of a reconfigurable matrix as a system resource. The OS provides for architecture independence, meaning that it does not matter for the OS whether the reconfigurable matrix is an attached resource, an embedded resource or completely integrated with the ISP. Further abstraction is provided, meaning that a virtual processor is abstracted in an efficient way, so that the execution details are hidden to the application (and programmer). Further means for scheduling, thus deciding how to perform true multitasking on the reconfigurable matrix, is provided. Communication means for setting up multi-purpose, efficient communication between the reconfigurable resource and the rest of the system components is provided. Creation of a HW/SW OS capable of handling all the hardware design differences of the existing and future platforms is extremely difficult. The reconfigurable matrix might be an attached resource (meaning, it might not always be present e.g. Ipaq Expansion Pack), and it could be an embedded resource, or even integrated with the ISP. The scheduling means performs scheduling of tasks on a heterogeneous multi-processor platform. In general, solving the scheduling issue, means solving the following problems: Since the computing resources are limited: how to decide what task to run and where, in case there are multiple processors are available. These decisions can be based on parameters like task priority, processor affinity, etc. In case of pre-emptive scheduling, the context of the current task can be saved, in order for this task to continue whenever additional computing resources are assigned to it. The applications run on the platform concerns multiple, possibly independent, tasks running in parallel on the reconfigurable matrix.

Another aspect of the invention makes a distinction between the following tasks: (i) software only tasks: they need an ISP to run, (ii) Hardware only tasks: can only be executed on a reconfigurable matrix and (iii) Hardware/Software tasks: this is a special kind of task that can be executed either on an ISP or a reconfigurable matrix. This also implies that both representations (ISP and reconfigurable matrix) are available on the platform. Tasks that can run either in hardware or in software are the most flexible kind of tasks: based on a set of parameter values, the OS scheduling system will decide what task will be run on what processor. This way the reconfigurable matrix will be filled with hardware capable tasks. In case not all hardware/software capable tasks are assigned to the reconfigurable matrix and if there is some spare computing power on the ISP, these unassigned tasks can be executed by the ISP.

In order to preserve the behaviour of the HW/SW task as much as possible (with respect to running the task in HW) when executing this task on the ISP, it is executed as a software task with hard real time properties. Furthermore, this software task is controlled by the same API, as when the task runs in hardware. This also simplifies switching such a task from hardware execution to software execution and vice versa. Context switching, when considering ISP's, means that the OS pre-empts the currently running task and stores its context. The context of such a task is fully described by the ISP's registers. Switching to the new task (for whatever reason), is done by simply loading its saved context into the ISP's registers and continuing execution at the point it was pre-empted. When pre-empting a task on a reconfigurable matrix, storing the context is done in a different way. The state of a hardware task is defined by several registers, placed all over the IP block. One possible way of extracting the state of the task running in hardware is to filter out all the relevant status information bits from the readback bitstream. Restoring the context, in that sense, implies setting the state of each single register in the configuration bitstream.

In an alternative approach, as soon as a hardware task running on the hardware device receives a pre-emption request from the scheduler, it moves from the switching point to a pre-emption state and sends a message containing its current state. This state information can be used to start a software program running on the ISP and continue at the pre-emption point of the hardware task, or to restore the context of hardware task at the next hardware context switch. This means, of course, that the amount and form of the state information that needs to be transferred at pre-emption is task dependent or could be switching point dependant. The storage and transfer/restoration of state information is managed by the HW/SW OS scheduler. This technique can also be applied when context switching is initiated by the hardware task itself. Further the hardware device, e.g. an FPGA, can incorporate architectural support for the HW/SW OS. For this purpose a kind of memory controller/programmer is provided. This takes care of saving/reloading context and configuration of the IP tiles. Suppose all tasks are partitioned, but a new HW/SW task comes in. Although it should be executed in HW, the HW/SW OS can decide to start it in SW in order to minimize execution latency and, as soon as the reconfiguration is finished, switch the task from SW to HW.

To create a true hardware/software multitasking environment, an operating system is provided by one aspect of the invention that manages the different applications running on the platform. The main function of the operating system is to manage tasks. An application running on the platform will contain a combination of tasks. Each of these tasks isq to run on one of the available resources. When a new task is started or an old task is deleted, some of the existing tasks might have to be rescheduled onto another resource (e.g. to provide more computational power to the new task or to decrease the power consumption). In accordance with an aspect of the invention, the task creation and deletion consist in the usual task handling for a software task, and in reconfiguring the FPGA for a hardware task. The operating system preferably keeps track of the available resources, meaning location of all the tasks running. For example, the OS can keep track of which tile of an FPGA is being used to execute a task. Task rescheduling is also provided by one embodiment of the invention. State equivalence is identified between a software task and a hardware task. Indeed, when a task is rescheduled from hardware to software or vice-versa, the state information is transferred in order to resume the task where it has stopped.

In one embodiment, the operating system handles communication between the tasks. Three possible cases are envisaged: communication between two hardware tasks, communication between a hardware task and a software task and communication between two software tasks. A preferred communication scheme is message passing. The communication between hardware tasks is preferably handled by an interconnection network. The operating system updates at run-time the routing tables of the tasks, and the network drives the messages to the correct destination. For hardware-software communication, the hardware block uses a specific address in its routing table that corresponds to the operating system. The messages between the ISP and the FPGA are stored in buffers. For software-software communication, the same scheme, e.g. message passing, is used in order to have a unified representation of the communication between tasks, no matter where the tasks are located. In order to guarantee some QoS in the system, real-time services should be provided by the operating system. The communication will indeed generate interrupts that should be handled fast enough (especially in the case of multimedia streams).

The operating system software can be supplied as a computer program product which includes code segments which when executed on a computing device execute methods in accordance with one aspect of the invention. One embodiment of the invention also includes a data carrier storing the operating system computer program product and being machine readable to install and execute the operating system when loaded into a computing device.

It is a further aspect of the invention to provide an abstraction layer, in the form of a device driver, between the reconfigurable matrix and the operating system (HW/SW OS). The application running on the computing platform communicates with the HW/SW OS, which in turn communicates with the device driver. Essentially no direct communication between the application and this device driver needs to exist. The device driver, that abstracts the reconfigurable matrix away from the HW/SW OS, handles the problem of where to place the HW tasks in the reconfigurable matrix. This device driver provides a uniform way to communicate with the reconfigurable hardware device. The abstraction layer is such that it works for a pre-routed network (ICN) on the reconfigurable device, e.g. an FPGA, and other runtime reconfigurable architectures, that have a different task placing mechanism, as long as a device driver with the suitable API is provided. The API informs the HW/SW OS of the parameters of the underlying HW: this includes the number of IP tiles (how many tasks can be run in parallel), the reconfiguration speed/latency, the communication speed/latency).

The driver software can be supplied as a computer program product which includes code segments which when executed on a computing device execute methods in accordance with one aspect of the invention. One embodiment of the invention also includes a data carrier storing the driver computer program product and being machine readable to execute the driver when loaded into a computing device.

In one embodiment of the invention, a middleware software is provided which has means for communicating with the operating system, the middleware software having means for performing the selection of whether a task will be selected as software or as hardware component. In this way a conventional operating system can be used which is enhanced by means of the middleware software to carry out methods in accordance with one aspect of the invention. The middleware can have means for handling a representation of the application running on the computing platform as a set of communicating threads. The middleware software may also assume the role of generating automatic code for a task either as hardware component or as software component. The selection of whether a task will be executed as a software or as a hardware component can be based on determining a trade-off in terms of QoS for the execution of the application.

The middleware software can be supplied as a computer program product which includes code segments which when executed on a computing device execute methods in accordance with one aspect of the invention. One embodiment of the invention also includes a data carrier storing the middleware computer program product and being machine readable to execute the middleware when loaded into a computing device.

The middleware layer has to fulfil two functions: platform abstraction and QoS-aware rescheduling of task. The user has access to real-time updates of services. For example, using a wireless networked device, the user downloads new services from service providers. A typical example is an applet that a user downloads while browsing the Internet. This applet is coded in a platform-abstracted way, e.g. using the JAVA™ framework. The code is then run on a JAVA virtual machine, e.g. running on a programmable processor. The JAVA virtual machine interprets the bytecodes of the applet. Applying the same concept to the heterogeneous platform in accordance with one aspect of the invention, a virtual machine is provided that can run applets on hardware as well as on software. A suitable hardware virtual machine is disclosed in U.S. Pat. No. 6,233,540 which is incorporated herein by reference in its entirety. A combination of a hardware and a software virtual machine is provided to have one unique machine that can, from a single bytecode, spawn tasks both in hardware and in software.

This approach also alleviates the problem of the design entry for the platform. The application is split into tasks and each task or some of the tasks can be run in hardware or software. But a software task is usually an object file, while the hardware task is represented by a bitstream. Therefore, the level of abstraction is raised. Three embodiments of the invention relate to this issue. In a first embodiment, several implementations with different hardware/software partitioning for an application are used, generated at design time; the different implementations providing different performances and for each application one of the implementations can be selected at run-time. The result is an object file and bitstreams. In a second embodiment, the application contains tasks for which both implementations will be available; the operating system will select at task level whether a task will run in hardware or software. In a third embodiment, a unified language is decoded by the operating system and executed on either the hardware or software resources.

The second and third embodiments present two possible solutions for the design entry. The second embodiment corresponds to a platform dependent approach. Every platform builder provides its own hardware/software compiler and that every application would be represented by two sets of tasks (a hardware and a software version for each task). The third embodiment corresponds to platform abstraction, in the same way as the JAVA virtual machine does for programmable processors. Indeed, using a compiler solution requires to store both versions, both hardware and software, for each task. This increases the memory footprint. On the other hand, having a unified representation can generate some overhead that would reduce the performance of the platform.

Another functionality of the middleware is the QoS aware rescheduling of tasks. The QoS aware rescheduling task of the middleware consists in determining the best trade-off in terms of QoS for the different applications that run simultaneously on the platform. By varying for each application the resources on which its tasks are running, different global QoS levels can be provided.

It is another aspect of the invention to provide an interconnection network on the reconfigurable matrix. Separating communication from computation enables hardware multitasking. Implementation of a fixed communication-layer that decouples the computation elements, allows them to be dynamically reconfigured. This communication layer is an interconnection network, allowing fast synchronous communication between hardware tasks implemented on the same matrix. The network can be a 2D torus, for instance, using wormhole routing. Interconnection networks allow fine-grain dynamic partial reconfiguration and make hardware multitasking a reality. As already mentioned, the platform can be composed of ISP(s), ASIC(s) and reconfigurable hardware. Multitasking on both the ISPs and the reconfigurable hardware is achieved. A reconfigurable hardware suited for running multiple tasks in parallel is provided.

To run independent tasks in parallel on one piece of reconfigurable hardware, tasks are removed and created without affecting other tasks. On a Field Programmable Gate Array (FPGA) for example, some part of the logic is modified without affecting the rest. Two embodiments are provided: (a) reading back the configuration of the FPGA, updating it and writing back the modified configuration; and (b) writing part of the configuration at each time, i.e. a partial reconfiguration is made. State-of-the-art FPGAs allow a partial reconfiguration of their functionality. For example, the Xilinx Virtex™ series offers a reconfiguration speed of 50 Mbytes/sec. Reconfiguring 10% of a 800 k system gates device (which contains 4715616 configuration bits), would take about 1.1 ms. This is fast enough for user-initiated interaction (starting a new program—the 3D game, for example) but may be too slow for a dynamic context switching of task. Therefore, to realize a dynamic multitasking system, the tasks will be spawned on the available resources, either a hardware tile or an ISP and the ISP will run a traditional multitasking operating system.

If a task requires, for example, for QoS reasons, to be executed in hardware, one of the less critical tasks running on a hardware tile will be reschedule onto an ISP, providing a free resource for the new task. However, each partial reconfiguration would need a complete Place and Route (P&R) iteration, which would prevent a run-time utilization. Indeed, the borders between the different blocks of the system are not fixed on the FPGA architecture, and would have to be rearranged each time a modification is performed. A P&R run typically takes minutes to hours, and is therefore not presently practical when targeting run-time reconfiguration. Therefore to avoid a complete P&R iteration for each reconfiguration, an additional layer is presented with fixed interface topology on top of the FPGA, to raise the granularity of the architecture. In this way a coarse-grain platform is created, containing a set of logical tiles that can be reconfigured separately. A fixed communication network between the tiles allows them to communicate together and with the ISPs. This separation between communication and computation enables an easy and flexible instantiation of new blocks of functionality in the system.

In a further embodiment of this interconnection feature of the invention, a packet-switched interconnection network is used. When applying this type of network in the context of FPGAs, no wires to route means that no cumbersome P&R iteration is required anymore. As communication model, the packet-switched interconnection network preferably uses message passing. This model can also be used towards the ISPs, so that a unified scheme is obtained for hardware/hardware and hardware/software communication. In short, in one aspect an interconnection network is built on top of an FPGA in order to allow dynamic reconfiguration of the tasks running in hardware. The communication scheme is unified for both hardware and software tasks.

Regarding the rest of the platform, fewer constraints are required. Preferably at least one of the ISPs should be used to run the operating system. This ISP should therefore have a connection to the reconfiguration interface of the FPGA. The ASIC part is there for managing fixed parts of the platform, like an LCD or connectivity (e.g., wireless).

The applications running on the platform can be composed of several software threads and of several hardware tasks. These HW and SW components are able to inter-communicate, i.e. a specific HW communication layer, compatible with SW communication, is presented. Hardware resources are shared by dividing the FPGA into logical tiles of coarse granularity. Examples of the use of such a tile is as a JPEG decoder. However, the reconfiguration grain is fine, i.e. an AES encryption module can replace the JPEG decoder. Tasks can be dynamically instantiated in the tile matrix by partial reconfiguration. The communication-layer can be a packet-switched Inter-Connection Network (ICN) and is fixed in place to allow Dynamic Partial Reconfiguration (DPR). In order to do multitasking, the FPGA is partitioned into an array of identical tiles, each tile running a hardware task, equivalent to a software thread. Whereas the granularity of the tiles is coarse, e.g. a tile running a JPEG decoder, the reconfiguration grain is fine: the same tile can be configured to run an image filter as well as a data encryption module.

The ability to dynamically reconfigure tasks depends on the control over the boundaries between them. This avoids the traditional design-flow. For example, conventionally, when an AES encryption module is reconfigured in place of a Laplace edge detector, their interfaces do not match and a Place and Route (P&R) on the whole FPGA has to be performed. However, by adding constraints to the positioning of the interface in accordance with one aspect of the invention, the P&R phase is only required at design-time because it yields hardware components with an identical input/output topology. Hardware tasks are thus encapsulated into a fixed layer providing them with a unified way of communicating. This communication layer raises the abstraction level of the hardware blocks, allowing easy Intellectual Property (IP) block integration. Various fixed communication layers such as buses and on-chip interconnection networks can be used to this end. However, a packet-switched network is preferred over a bus for three reasons. A simple bus is a major bottle-neck because its routing resources are shared by all connected blocks, whereas in a network routing resources are distributed. A network is therefore easily scalable, whereas the complexity of a bus arbiter increases with the number of blocks controlled. Finally, networks are more power efficient than buses, because idle parts can be powered off, whereas buses must always drive long lines. An interconnection network can be seen as an array of routers interconnecting an array of processors.

Figure 7:
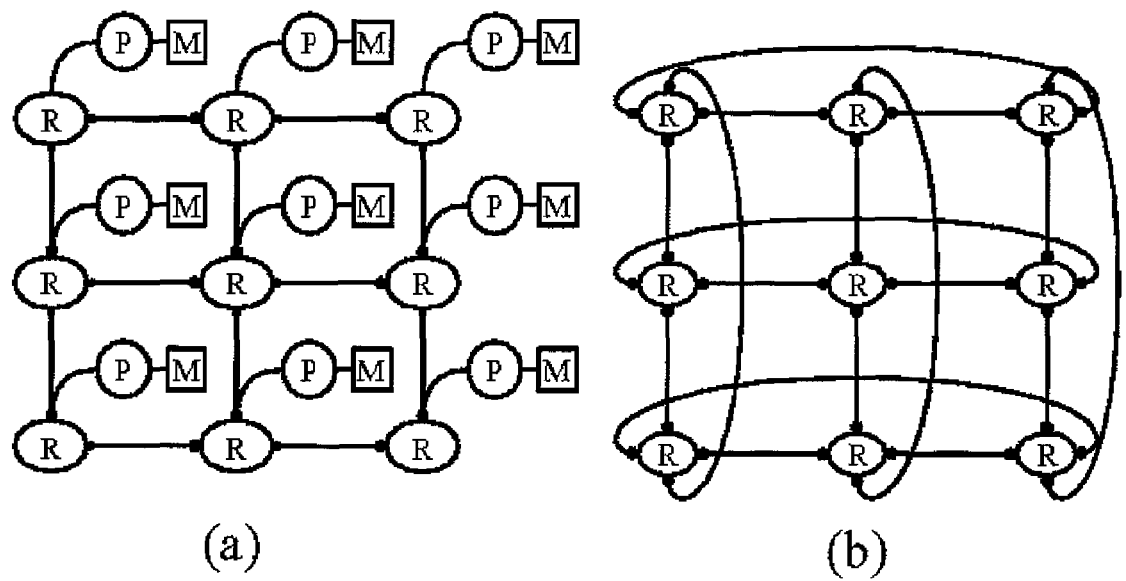
FIGS. 7a and 7b show arrangements of routers.

In general each processor has direct access to a local memory, without using the ICN. Other interconnection networks can successfully used such as the J-Machine, with various forms of architectures, e.g. k-ary n-cubes, hypercubes, butterflies, crossbars and routing policies, e.g. virtual cut-through, wormhole, mad-postman switching. Embodiments of the invention are implemented as a whole network with all the processors on the same FPGA. The choice of ICN is therefore dictated by the need for low hardware overhead. A network, and therefore its complexity, are described by two parameters: topology and routing algorithm. An FPGA is a 2-dimensional chip, so a 2D network topology is suitable. In a mesh-topology a router has to be able to route in all directions: North, South, East and West (FIG. 7a). It is possible to reduce the router complexity by using a similar topology, called a torus network. Such a network folds the mesh along the horizontal and vertical directions and therefore only requires routing along two directions, i.e. East and South (FIG. 7b). However, this complexity reduction comes at the expense of a 15% increase (for a 4*4 folded torus) in power consumption with respect to a mesh network. A suitable routing algorithm in a 2D torus is called Wormhole Routing. It is a blocking, hop-based, deterministic routing algorithm. It uses relative addresses and thus does not require a global knowledge of the network. In wormhole switching, message packets are pipelined through the network. This technique relieves routers of buffering complete messages, thus making them small and fast. A message is broken into flits (flow control units). Flits come in two types: header flits, containing routing information and data flits containing the message itself. The two header flits give the number of channels that must be traversed respectively in the X and Y directions. Packets are routed first along the X direction, then along the Y direction before reaching their target. The value in the X header flit is decremented each time a router is traversed. When it reaches zero, the X heading flit is discarded and routing starts on the Y dimension. When Y equals zero, the message enters the destination hardware block (see FIG. 8a). The network can use two time-multiplexed Virtual Channels (VC) to avoid deadlocks (see FIG. 8b). Deadlocks in an interconnection network occur when no message can advance toward its destination because all queues are full with messages not destined to neighboring routers. Router 0 only sends messages on VC_0, whereas the other routers may initiate messages only on VC_1 (see FIG. 8b). This virtual channel management policy avoids deadlocks by breaking the torus into a spiral.

It is another aspect of the invention to present method for execution of an application or a plurality of applications, the execution requiring running substantially simultaneously a plurality of tasks (multi-tasking), on the platform. The execution method allows for dynamically instantiation of HW tasks by exploiting partial reconfiguration of a reconfigurable matrix, for a low hardware overhead. Parts of the reconfigurable matrix, e.g. a tile, are reconfigured, hence fine-grain configurability is exploited.

Another aspect of the invention provides a new class of hybrid platforms dynamically mixing hardware and software components. This aspect of the invention thus concerns reconfigurable architectures, composed of an instruction-set processor running software processes and coupled to a reconfigurable hardware device such as an FPGA on which hardware tasks are spawned by dynamic partial reconfiguration. Separating communication from computation enables hardware multi-tasking. The invention is not limited to a specific driver application.

As an example, a user powers on a portable device to watch a movie. He presses the start button and begins enjoying the show. Some time later, a scene is boring him. He wants to play a 3D game for a while, while the scene is going on. He will resume watching the movie after the scene. He therefore wants to have the movie being displayed in a small part of the screen. The computing platform is used in the portable device. It is composed of one or more ISP(s), one or more application specific integrated circuit(s) (ASIC) for functions like wireless communication or LCD management, and reconfigurable hardware. When the user is starting his movie decoder the first time, the reconfigurable hardware is free and completely available. As a result, the movie player can be started on it, as a hardware task. The computational power of the reconfigurable hardware allows playing the movie at full quality. When the user decides to start the 3D game, there are not enough resources available on the reconfigurable hardware to run both applications. However the movie can be downscaled in resolution and frame rate, resulting in reduced computational requirements for the player. The movie player can therefore be rescheduled into one of the ISPs, as a software task. This frees up some hardware resources and allows the 3D game to be started as a hardware task. For different multimedia content, different architectures are required. Consequently the two architectures would have to be present on the device to enable the same scenario. By running these applications on a reconfigurable hardware this problem is avoided. An architecture can be downloaded that fits best the application running on the device.

An ASIP can be tuned for each application, and replaced every time the application is changed. This scenario can be extended to the task level. An application is typically composed of communicating tasks. The reconfigurable hardware can run multiple separate (hardware) tasks at the same time. As a result, the platform can realize true hardware-software multitasking. Consider a reconfigurable hardware matrix containing $n_h$ tiles. Each of these tiles is able to run a task. An application i is divided into $n_i$ tasks. Each task can be run either in hardware or in software. The system will first try to schedule the tasks on the hardware tiles. If it fails—meaning that the sum of the tasks of each application is bigger than the $n_h$ available—two solutions can be envisaged: the operating system and/or middleware selects which tasks are critical and should be run in hardware, and schedules the other ones on the ISP or the tasks are dynamically scheduled one after the other on the hardware tiles. The first solution implies that some applications would receive more compute power than others, generating the best trade-off for the user. The second solution is equivalent to consider the $n_h$ tiles as $n_h$ processors that can schedule multiple tasks sequentially. It requires the possibility to perform a context switch of a hardware task.

Figure 5:
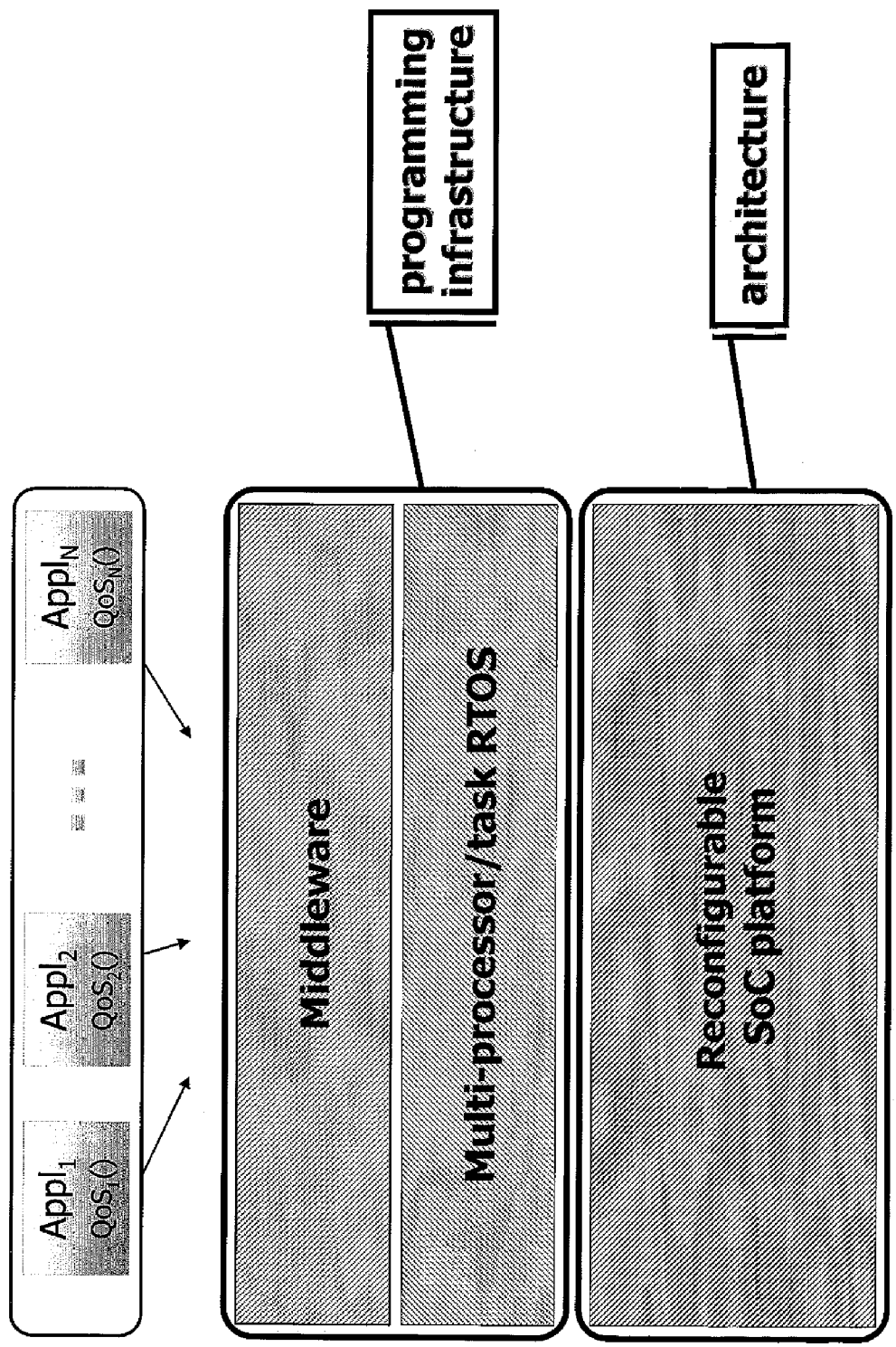
FIG. 5 is a representation of an architecture in accordance with an embodiment of the invention.

One embodiment of the invention can be represented in three layers as shown in FIG. 5. The lowest layer 10 represents the physical platform in itself, including the reconfigurable hardware and the ISPs. The middle and upper layers 12, 14 comprise the programming infrastructure that needs to be built on top of the physical platform 10 to allow easy design of applications on it. The middle layer 12 is the operating system, which enables multitasking of both hardware tasks and software tasks, and provides some real-time services. The upper layer 14 is a middleware layer that delivers two types of services. First, it creates an abstraction layer for the programmers. Indeed, these are preferably shielded from the internals of the platform, having a common way of coding their applications 16 independently of the target device on which they would run. Second, the middleware 14 has to manage the usage of the resources in order to provide always the best trade-off in terms of QoS for each of the applications.

As an example of an implementation of the invention, a board is provided containing a Xilinx Virtex-II™ XC2V6000 FPGA, a Compaq iPaq™ handheld device and some glue logic. The FPGA serves as the reconfigurable hardware device, having a packet-switched interconnection network, and runs hardware tasks. The iPaq contains the rest of the platform. There is only one ISP, which is a StrongARM SA-1110 processor, for example. The iPaq and the FPGA board are connected together via the Expansion Bus of the iPaq. The communication between the processor and the network on the FPGA is performed by buffering messages in a Random Access Memory, e.g. a DPRAM. The glue logic on the FPGA board allows the processor to perform a partial reconfiguration of the FPGA. The operating system is based on Linux™, for example. A port of Linux is indeed available for the iPaq. Real-time services to the Linux OS (RT-Linux), running on the processor (206 Mhz) is added. Extensions enabling the management of hardware tasks are added. The interconnection network is a 2D torus using wormhole routing, for example. This implementation achieves transfer rates up to 77.6 MB/s between two adjacent routers, when clocked at 40 MHz. Interconnection networks on FPGAs allow fine-grain dynamic partial reconfiguration and make hardware multi-tasking a reality.

A further example of an implementation of the invention is a packet-switched ICN on a Virtex XCV800. Reconfigurable designs can target the Virtex II, because it features 6 columns of block-RAMs (BRAMs), allowing implementation of up to 6 routers, whereas the Virtex I has only 2. The data-path width is chosen to maximize the network's throughput. However, it cannot be too wide, because on the Virtex I family the BRAM element is 16-bit wide. Moreover, reconfigurable modules have to use the scarce number of long-lines connecting tri-state buffers to connect routers together and to get access to resources such as BRAMs or multipliers. Preferably the availability to these resources is prioritized. Therefore, on the network, messages are segmented into 16-bit flits. The Maximum Transfer Unit (MTU) is fixed to 128 data flits per message, enabling a Virtex I to buffer two messages in a BRAM. The ICN is fully pipelined and achieves, between two routers, a peak rate of 38.8 MBytes/s per virtual channel, when clocked at 40 MHz. Hardware tasks can be slow compared to the network's bitrates. Therefore, to avoid blocking, the hardware tasks are decoupled from the network using interfaces.

These interfaces use dual-port BRAMs (Block Random Access Memory) to buffer messages and work as a network abstraction layer for the hardware task. The ICN is connected to the memory bus of the Strong-Arm SA1110 on a Compaq iPaq 3760. A specialized interface (IO interface) resides at the border of the FPGA to enable communication with the CPU. The IO interface uses control registers and interrupts to communicate with the CPU and its message buffers are memory mapped to the SA1110. The scheduling of the hardware tasks is done on the CPU. Moreover, the reconfiguration of the Virtex is also done by the CPU, which accesses the Virtex select-map port through some glue-logic. At 50 MHz a Virtex XCV800 can be reconfigured in less than 11 ms (39.5 ms on a XC2V6000). For partial reconfiguration can be achieved at well under 5 ms, which allows hardware tasks to start in a time a user cannot perceive.

Figure 6:
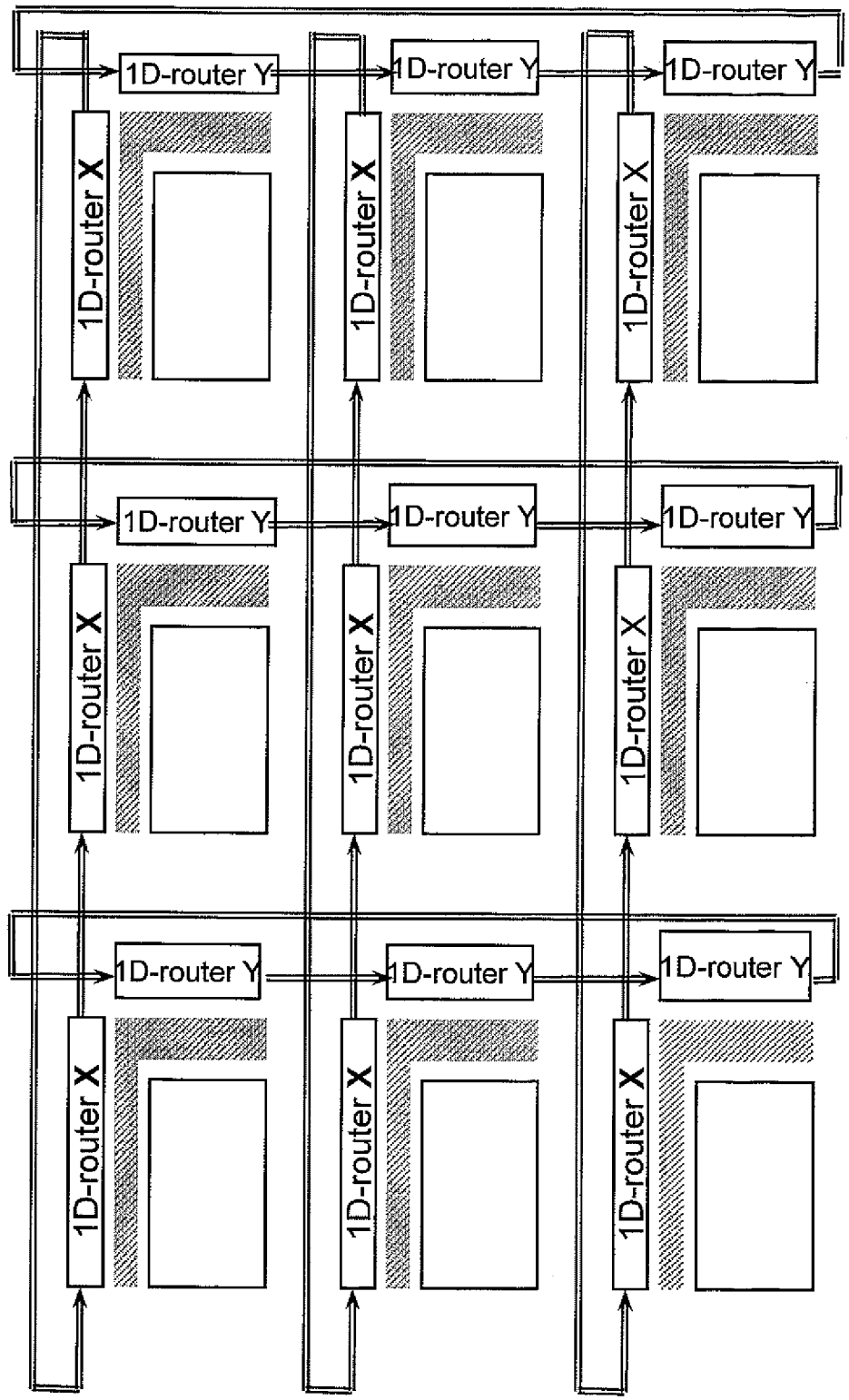
FIG. 6 is a representation of a reconfigurable device in accordance with an embodiment of the invention.

On a 2D torus, rows are equivalent to columns, therefore the torus can be decomposed into rows of 1D toruses connected to columns of 1D toruses as shown in FIG. 6. Two simple 1D routers 28 can be chained to obtain a 2D router and produce a more modular network. A 1D-router has two input/output channels as shown in FIG. 8. A message entering a router 28 can either be forwarded along the current direction or sent orthogonally, either on a column if the Y header-flit is non-zero, or into a hardware task 29. Each channel is composed of a 16-bit data path and of 3-bit control signals. Two control-bits are used to signal the presence of a message and its destination and the third is a back-pressure signal (NACK) used to block a message entering a busy router or interface. The routers 28 handle two time-multiplexed VCs to avoid deadlocking. These VCs are interleaved, with one clock cycle each. For efficiency, the router is fully pipelined. Because the data channels are interleaved the control signals are also interleaved and precede data by one clock cycle. The NACK signal, used for blocking, is back-propagated along the message path. It takes two ticks for a flit to get out of a router, therefore at each clock cycle data is transmitted on, alternating VCs.

Figure 9:
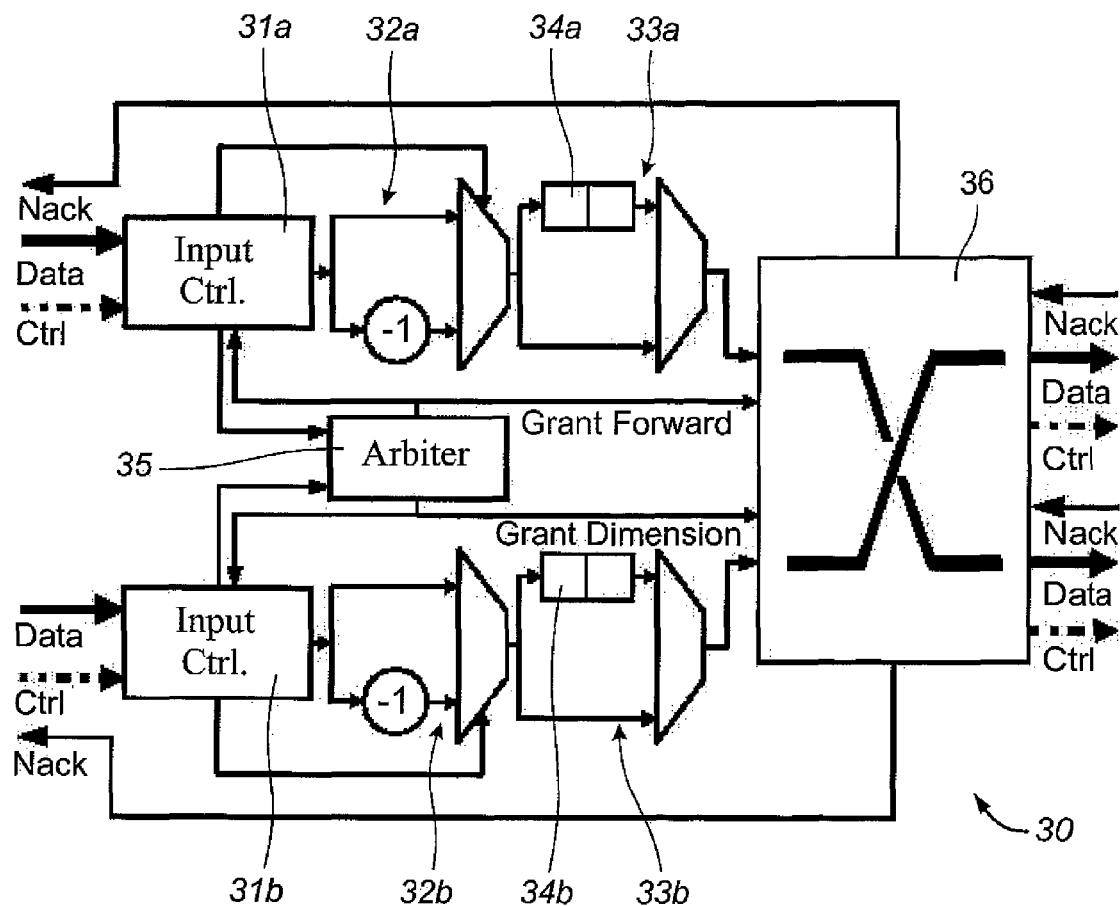
FIG. 9 is a representation of a net cell in accordance with an embodiment of the invention.

A 1D-router is composed of one input controller 31 per channel, one arbiter 35 and an output-controller 36 as shown in FIG. 9. The input controllers 31*a*, 31*b* issue output requests to a round-robin arbiter 35 and a unit 32*a*, 32*b* decrements header-flits when routing. Each output channel has a unit 33*a*, 33*b* with a 2-flit deep buffer 34*a*, 34*b* to be able to resume blocked messages. The output controller 36 is composed of a 2-input crossbar-switch and the NACK. An interface decouples the hardware task 29 from the network using DP-RAMs as message buffers. The hardware task 29 (FIG. 6) can then use independent data-width and clock rates, allowing easy IP integration. The interfaces are designed to cope with the sustained bit-rates required by the ICN and perform multiple-message buffering to reduce network congestion. Moreover the interface, called a "net-cell", provides the hardware task (or IP-block) with high-level communication by means of routing tables. Hardware tasks 29 within an application communicate through a tuple composed of a logical address and a port number, similar to the IP address and UDP port number for the UDP protocol. Routing tables transform a destination logical address into the number of X and Y hops on the network. The routing tables are updated by the RT-OS to match the position of the IP-block in the network. Therefore, a task does not need to know where it is situated in the network and whether the tasks it communicates with are running in hardware or software. The RT-OS adapts the routing tables after an IP-block reconfiguration. They can also be modified at any time without having to reset or stop the hardware task. This is very useful if some other task from the same application is switched in or out of the network as a function of the available resources and the QoS policy. The net-cell buffers two input and two output messages on a Virtex I and eight on the Virtex II. Each message buffer is complemented by a control register bank giving the length and origin/destination of the message. This high-level protocol information such as port number or net-cell origin is piggybacked in the Y-header flit and does not require extra bandwidth.

Figure 10:
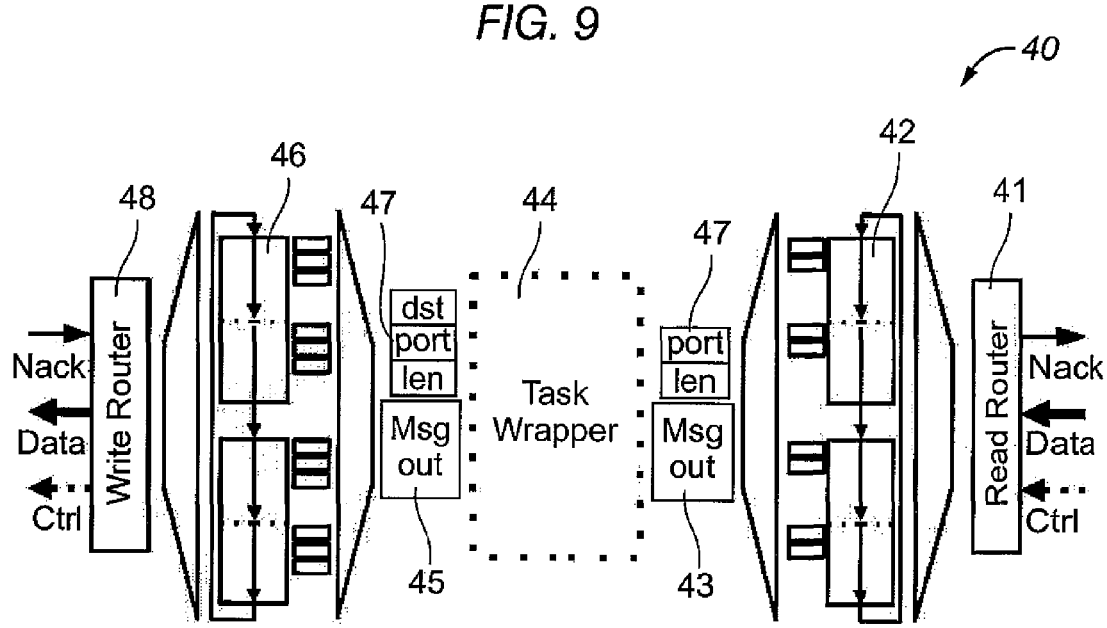
FIG. 10 is a representation of data flow between two routers in accordance with an embodiment of the invention.

A net-cell 40 is composed of a process of reading 41 the local router and steering the storage of messages in a circular linked-list 42 of message buffers and control registers as shown in FIG. 10. The hardware task is encapsulated in a block 44 that always presents the same fixed interface giving access to a message-in presentation layer 43 and a message-out presentation layer 45. Moreover, this fixed block 44 also gives ports 47 to extra local resources such as BRAMS or even multipliers on a Virtex II. The presentation layers 43, 45 abstract the internals of the net-cell from the IP-block. A process is continued by steering the storage of messages in a circular linked-list 46 of message buffers and control registers and of writing 46 to the next local router.

The reconfigurable platform is composed of an ISP (SA-1110) coupled to an FPGA through its memory bus. A special interface, similar to a net-cell, has been designed to allow fast and efficient communication between them by means of memory-mapped registers and interrupts. The Virtex I implementation can buffer 8 input and 8 output messages in its BRAMs. These are mapped in the memory space of the SA-1110 to allow fast access. Indeed, on an iPaq 3760 the SA-1110 has a maximum access speed of up to 103 MHz on its memory bus.

Figure 11:
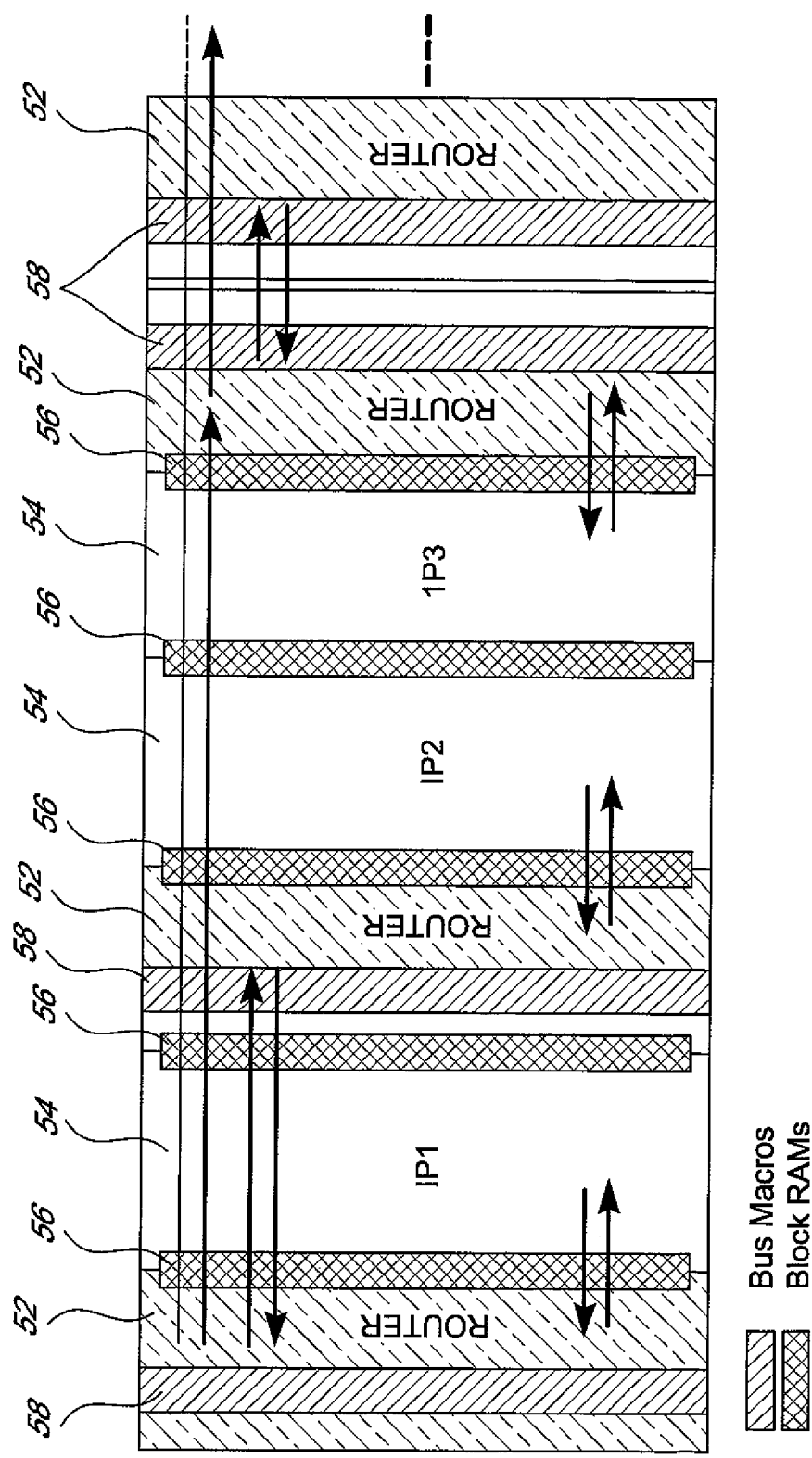
FIG. 11 shows a representation of an arrangement of routers, IP blocks bus macros and block RAMs in accordance with an embodiment of the invention.

The full design is composed of fixed router modules 52 and replaceable IP modules 54 as shown in FIG. 11. The IP modules 54 can be loaded dynamically, according to the user actions. When a new IP module 54 is to be loaded into the FPGA it will be placed into a free predefined area, or will replace a module that is no longer needed. In order to be able to dynamically reconfigure the design, partial bitstreams of the IP modules 54 must be available. The partial bitstreams for the IP modules 54 can be generated following the Partial Reconfiguration (PR) methodology developed by Xilinx (ISE tool suite v4.2 and higher).

According to the Xilinx methodology, the design has to be partitioned in fixed and reconfigurable modules. Routers 52 are fixed and hardware tasks are executed on the reconfigurable modules. In principle, during the partial reconfiguration process all the modules can continue working, except for the reconfigured module. However, if the network has to maintain communication between modules this may not be possible. According to the PR methodology, the reconfigurable modules must span the whole chip from top to bottom. Therefore the 2D torus must be folded into a 1D structure and consequently the communication between routers has to traverse the reconfigurable modules.

The communication with the reconfigurable modules can take place through a "Bus Macro" 56 (BM—see FIG. 11). The BM 56 ensures the reproducibility of the design routing and is implemented using tri-state buffers. The tri-state buffers force the routing to always pass through the same places. At the same time they decouple the modules from each other during reconfiguration, avoiding possible harmful transitory situations. In this way, a 4 bit per row communication channel is possible between adjacent modules. This limitation comes from the current Virtex architecture and its limited routing resources. The Virtex II 6000 has 96 rows, limiting the total number of bits passing through the interface to 384. Moreover, the BMs 56 only support unidirectional signals, strongly limiting the minimum size of an FPGA that can be used to implement the network.

The current Xilinx tool suite requires the modules to have widths in multiples of 4 columns. A Virtex II 6000 has 88 columns which sets the upper limit of the possible modules to 22. However, the main limitation in the number of modules comes from the fact that all resources, such as BRAMs 58, present inside the area reserved for a module can only be used by that module. Because the routers 52 use BRAMs 58, the maximum number of routers 52 is given by the number of BRAM columns available on the FPGA: 2 for a Virtex I and 6 for a Virtex II 6000. The use of an ICN brings in some hardware overhead. The synthesis has been performed with Synopsys Design Compiler on a Virtex XCV800. For a 2*2 torus network the hardware overhead on a Virtex XCV800 amounts to 35%, but drops to 9.5% on a bigger Virtex XC2V6000. The ICN is fully pipelined and it takes 2 clock cycles to transmit one 16-bit flit on a given VC. There are 128 data flits in a message and two extra header flits plus two more for the message tail. The bandwidth between two adjacent routers, per VC is therefore: (16-bit*20 MHz*128/132)/8=38.8 MBytes/s. On a 2*2 torus network, the total bandwidth is therefore 310.4 MBytes/s. The throughput of the network is however limited by the deterministic routing scheme. If each task is simultaneously sending a message, the throughput drops to 20%.

A technique to overcome this problem is to clock the network faster than the hardware tasks. The proposed three steps enable the use of interconnection networks to perform fine-grain dynamic multi-tasking on FPGAs. In the first place, one separates communication from computation by using a fixed communication layer. To this end, interconnection networks are to be preferred over bus architectures because they are more scalable and consume less power. The interconnection network can be a fully-pipelined 2D-torus that uses wormhole routing to minimize hardware overhead and achieves 77.6 MBytes/s at 40 MHz. Finally, dynamic partial reconfiguration is possible on Virtex FPGAs by folding the 2D-network into a 1D-structure fitting the Virtex column-based architecture.

It is another aspect of the invention to provide an operating system (or at least extensions for traditional operating systems) for reconfigurable systems (OS4RS) capable of managing the tasks over the different resources, including handling of hardware tasks.

The OS4RS provides multiple functions. First of all, it implements a hardware abstraction layer (HAL), which provides a clean interface to the reconfigurable logic. Secondly, the OS4RS is responsible for scheduling tasks, both on the ISP and on the reconfigurable logic. This implies that the OS4RS abstracts the total computational pool, containing the ISP and the reconfigurable tiles, in such a way that the application designer is not aware on which computing resource the application will run. A critical part of the functionality is the uniform communication framework, which allows tasks to send/receive messages, regardless of their execution location.

On top of the operating system a middle layer taking the application as input and deciding on the partitioning of the tasks, is provided. This decision is driven by quality-of-service considerations.

An application should preferably be designed in such a way that it can be executed on the platform. In a first approach, a uniform HW/SW design environment is used to design the application. Although it ensures a common behavior for both HW and SW versions of the task, it still requires both versions of the task to be present in memory. Alternatively unified code that can be interpreted by the middleware layer and spawned either in HW or SW can be used. This approach is not only platform independent similar to JAVA, it also reduces the memory footprint, since the software and the hardware code will be integrated.

Relocating a task from hardware to software need not affect the way other tasks are communicating with the relocated task. By providing a uniform communication scheme for hardware and software tasks, the OS4RS hides this complexity.

In an embodiment the inter-task communication is based on message passing. Messages are transferred from one task to another in a common format for both hardware and software tasks. Both the operating system and the hardware architecture should therefore support this kind of communication.

Every task is assigned a logical address. Whenever the OS4RS schedules a task in hardware, an address translation table is updated. This address translation table allows the operating system to translate a logical address into a physical address and vice versa. The assigned physical address is based on the location of the task in the interconnection network (ICN).

The OS4RS 1 provides a message passing API 2, which uses these logical/physical addresses to route the messages as shown in FIG. 1. In an exemplary communication scheme, three subtypes of message passing between tasks can be distinguished.

Messages 3 between two tasks (P1 and P2), both scheduled on the ISP 6, are routed solely based on their logical address and do not pass the hardware abstraction layer (HAL) 7.

Communication 4 between an ISP task (P3) and a hardware (FPGA) task (Pc) does pass through the hardware abstraction layer 7. In this case, a translation between the logical address and the physical address is performed by the communication API. The task's physical address allows the HAL 7 to determine on which tile 9 of the ICN the sending or receiving task is executing.

On the hardware side, the packet-switched interconnection network is providing the necessary support for message passing. Messages 5 between tasks, both scheduled in hardware 8, are routed inside the interconnection network without passing through the HAL 7. Nevertheless, since the operating system 1 controls the task placement, it also controls the way the messages are routed inside the ICN, by adjusting the hardware task routing tables.

The packet-switched interconnection network, which supports the hardware communication, solves some operating system issues related to hardware management such as task placement, location independence, routing, and inter-task communication. Task placement is the problem of positioning a task somewhere in the reconfigurable hardware fabric.

At design time, task placement is realized by using place and route tools from the reconfigurable hardware vendor. This usually generates an irregular task footprint. At run-time, the management software is responsible for arranging all the tasks inside the reconfigurable fabric. When using irregular task shapes, the management software needs to run a complex fitting algorithm. Executing this placement algorithm considerably increases run-time overhead. Preferably, the designer constrains the place and route tool to fit the task in the shape of a tile. Run-time task placement is therefore greatly facilitated, since every tile 9 has the same size and same shape. The OS4RS 1 is aware of the tile usage at any moment. As a consequence, it can spawn a new task without placement overhead by replacing the tile content through partial reconfiguration of the reconfigurable hardware device 8 (FPGA).

Location independence consists of being able to place any task in any free location. This is an FPGA-dependent problem, which requires a relocatable bitstream for every task. A first approach is to have a partial bitstream for every tile 9. A second alternative is to manipulate a single bitstream at run-time.

The run-time routing problem can be described as providing connectivity between the newly placed task and the rest of the system. A communication infrastructure is implemented at design-time inside the interconnection network. This infrastructure provides the new task with a fixed communication interface, based on routing tables. Once again, the OS4RS 1 should not run any complex algorithm. Its only action is updating the routing tables every time a new task is inserted/removed from the reconfigurable hardware 8.

A trade-off is made between area and run-time overhead. As every tile 9 is identical in size and shape, the area fragmentation is indeed higher than in a system where the logic blocks can have different sizes and shapes. However, the OS4RS 1 will only need a very small execution time to spawn a task on the reconfigurable hardware 8, since the allocation algorithm is limited to the check of tile availability.

For the relocatable tasks, a common behavior for the HW and the SW implementation of a task is provided. In one embodiment a unified representation is provided that can be refined to both hardware and software.

Consider a C++ library (denoted OCAPI-x1) that allows unified hardware/software system design as described generally in U.S. Pat. No. 6,233,540 which is incorporated herein by reference. Through the use of the set of objects from OCAPI-x1, a designer can represent the application as communicating threads. The objects contain timing information, allowing cycle-true simulation of the system as described in EP 1,022,654 which is incorporated herein by reference. Once the system is designed, automatic code generation for both hardware and software is available. This ensures a uniform behavior for both implementations in a heterogeneous reconfigurable system.

Through the use of the FLI (Foreign Language Interface) feature of OCAPI-x1, an interface can be designed that represents the communication with the other tasks. This interface provides functions like send_message and receive_message that will afterwards be expanded to the corresponding hardware or software implementation code. This ensures a communication scheme that is common to both implementations.

It is possible for the programmer to know at design time on which of the heterogeneous processors the tasks preferably should run. However, one embodiment of the invention does not guarantee run-time availability of hardware tiles. Furthermore, the switch latency of hardware tasks (in the range of 20 ms on a FPGA) severely limits the number of time-based context switches. It is preferred if spatial multitasking is made in hardware, in contrast to the time-based multitasking presented. Since the number of tiles is limited, the OS4RS is forced to decide at run-time on the allocation of resources, in order to achieve maximum performance. Consequently, it is possible for the OS4RS to pre-empt and relocate tasks from the reconfigurable logic to the ISP and vice versa.

The ISP registers and the task memory completely describe the state of any task running on the ISP. Consequently, the state of a pre-empted task can be fully saved by pushing all the ISP registers on the task stack. Whenever the task gets rescheduled at the ISP, simply popping the register values from its stack and initializing the registers with these values restores its state.

This approach is not usable for a hardware task, since it depicts its state in a completely different way: state information is held in several registers, latches and internal memory, in a way that is very specific for a given task implementation. There is no simple, universal state representation, as for tasks executing on the ISP. Nevertheless, the operating system will need a way to extract and restore the state of a task executing in hardware, since this is a key issue when enabling heterogeneous context switches.

A way to extract and restore state when dealing with tasks executing on the reconfigurable logic can be achieved by getting all status information bits out of the read back bitstream. This way, manipulation of the configuration bitstream allows re-initializing the hardware task. Adopting this methodology to enable heterogeneous context switches requires a translation layer in the operating system, allowing it to translate an ISP type state into FPGA state bits and vice versa. Furthermore, with this technique, the exact position of all the configuration bits in the bitstream must be known. It is clear that this kind of approach does not produce a universally applicable solution for storing/restoring task state. It is preferred to use a high level abstraction of the task state information. This way the OS4RS is able to dynamically reschedule a task from the ISP to the reconfigurable logic and vice versa.

Figure 2B:
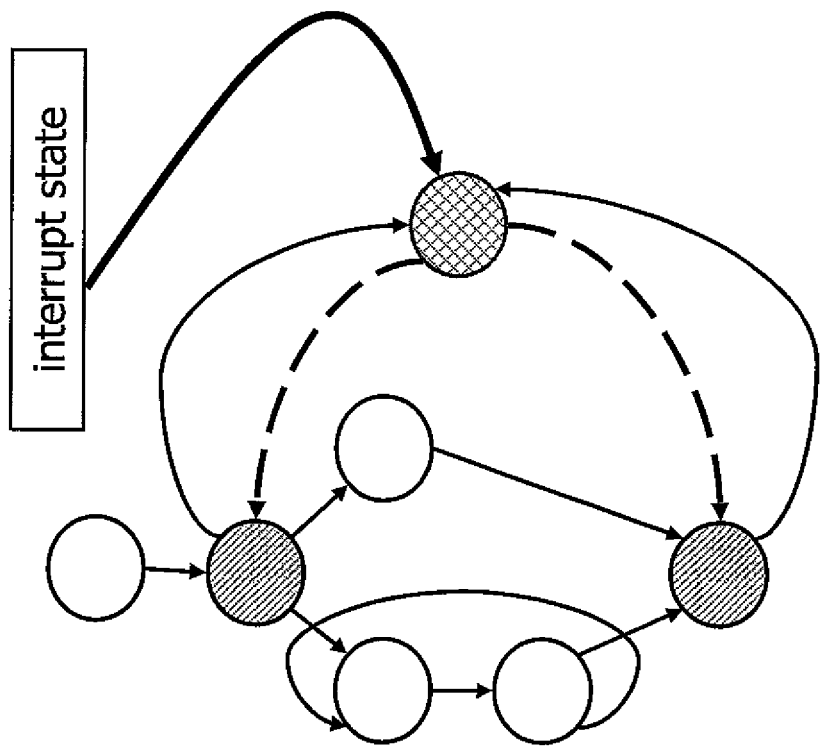
FIGS. 2a and 2b and FIG. 3 show representations of a state switch in accordance with an embodiment of the invention.
Figure 2A:
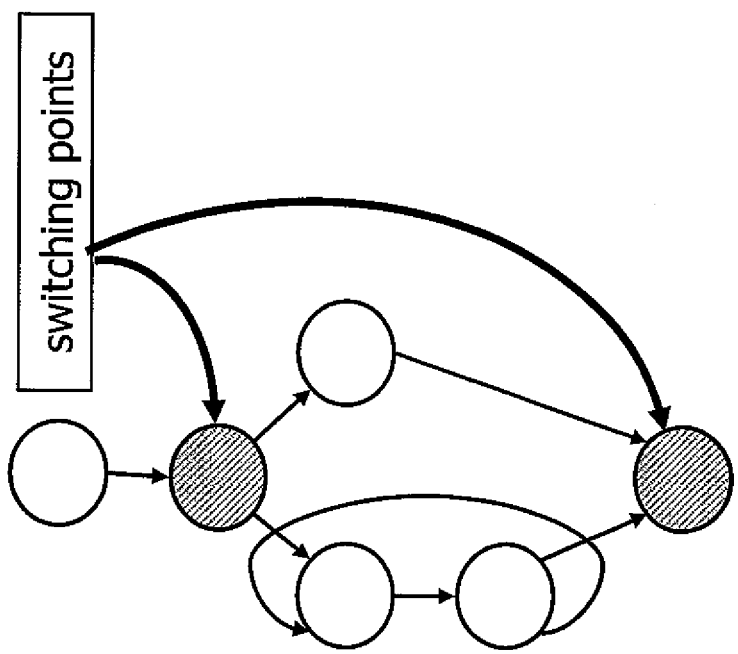
Figure 3:
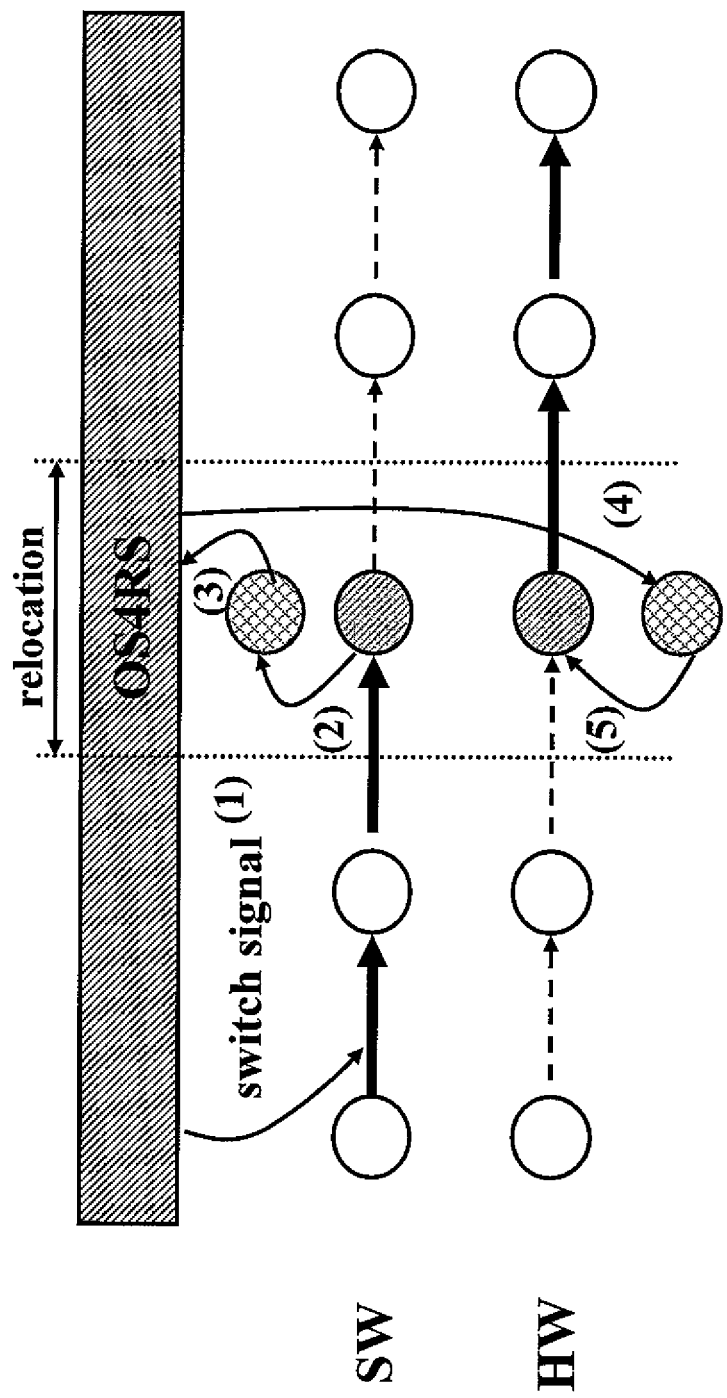

FIG. 2a represents a relocatable task, containing several states 21-26. This task contains 2 switch-point states 22, 26 at which the operating system can relocate the task. The entire switch process is described in detail in FIG. 3. In order to relocate a task, the operating system can signal that task at any time as in (1). Whenever the signalled task reaches a switch-point, it goes into the interrupted state (2) that is also shown in FIG. 2b as state 27. Switch points in a task are described EP 0 918 280 which is incorporated herein by reference. In this interrupted state 27 all the relevant state information of the switch-point is transferred to the OS4RS—item (3) of FIG. 3. Consequently, the OS4RS will re-initiate the task on the second heterogeneous processor using the received state information—item (4). The task resumes on the second processor, by continuing to execute in the corresponding switch-point—item (5). Note that the task shown in FIG. 2 contains multiple switch-points 22, 26, which makes it possible that the state information that needs to be transferred to the OS4RS can be different for each switch-point 22, 26. Furthermore, the unified design of both the ISP and FPGA version of a task, ensures that the position of the switch-points 22, 26 and the state information are identical.

A relocatable video decode example described below illustrates that the developed operating system is able to dynamically reschedule a task from the ISP to the reconfigurable logic and vice versa. At this point in time, this simplified application contains only one switchable state, which contains no state information. This, however, illustrates the importance of the location of the switch-points. Designers preferably create their applications and place the switch-points in such a way that the amount of state information is minimal, since the time needed to transfer this information adds directly to the context switching overhead. The insertion of these "low overhead" switch-points will also be strongly architecture dependent: in case of a shared memory between the ISP and the reconfigurable logic, transferring state can be as simple as passing a pointer, while in case of distributed memory, data will have to be copied.

Alternatively a design tool should be able to create these switch-points automatically or at least give suggestions therefore. One of the inputs of the design tool will be the target architecture. The OS4RS will then use these switch-points to perform the context switches in a way hidden from the designer.

As an illustration of the invention a relocatable video decoder is presented. First, the platform on which the decoder as implemented is described. Then, the decoder implementation is detailed. Finally, performance and implementation results are presented.

A first reconfigurable computing platform for HW/SW multitasking is provided. A Gecko demonstrator is a platform composed of a Compaq iPAQ 3760 and a Xilinx Virtex 2 FPGA. The iPAQ is a personal digital assistant (PDA) that features a StrongARM SA-1110 ISP and an expansion bus that allows connection of an external device. In one embodiment, the FPGA is a XC2V6000 containing 6000 k system gates. The FPGA is mounted on a generic prototyping board connected to the iPAQ via the expansion bus. On the FPGA, a soft packet-switched interconnection network composed of two application tiles and one interface tile is provided. The Gecko platform is showcasing a video decoder that can be executed in hardware or in software and that can be rescheduled at run-time. In one embodiment, the video decoder is a motion JPEG frame decoder.

Figure 4:
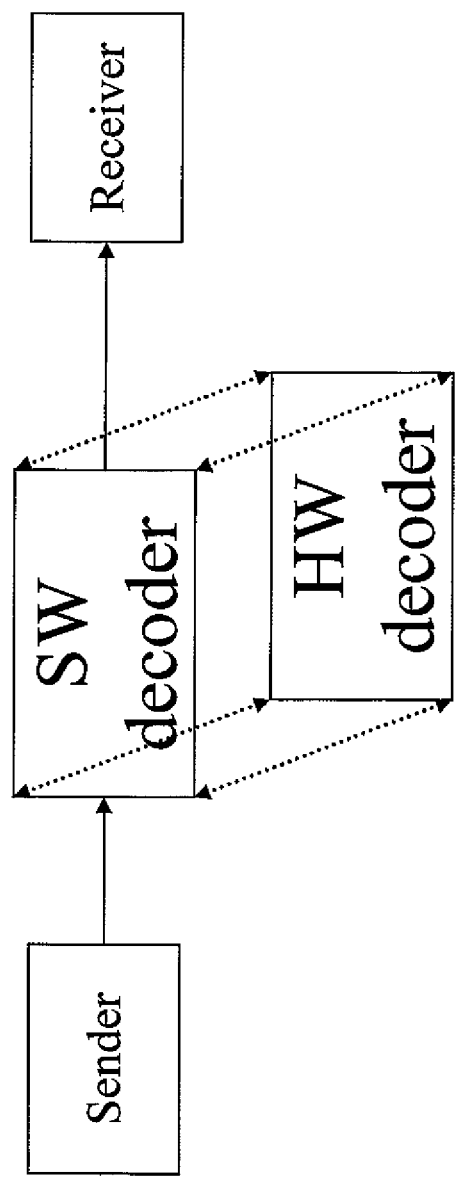
FIG. 4 is a representation of a switch between a decode running on software and hardware in accordance with another embodiment of the invention.

A send thread 100 passes the coded frames one by one to the decoder thread 102, 106 as shown in FIG. 4. This thread 102, 106 decodes the frames and sends them, one macroblock at a time, to a receive thread 104 that reconstructs the images and displays them. The send thread 100 and the receive thread 104 run in software on the iPAQ, while the decoder thread 102, 106 can be scheduled in HW or in SW (FIG. 4). The switch point has been inserted at the end of the frame because, at this point, no state information has to be transferred from HW to SW or vice-versa. Two implementations of the JPEG decoder have been implemented. The first one is quality factor and run-length encoding specific (referred as specific hereafter), meaning that the quantization tables and the Huffman tables are fixed, while the second one can accept any of these tables (referred as general hereafter). Both implementations target the 4:2:0 sampling ratio. Table 1 details the results of the implementation of the decoders in hardware. (These results are given by the report file from the Synplicity® Synplify Pro™ advanced FPGA synthesis tool, targeting the Virtex2 XC2V6000 device, with BF957 package and speed grade −4, and for a required clock frequency of 40 MHz).

TABLE 1

Hardware implementation of the decoder

|  | Specific implementation | General implementation |
|---|---|---|
| Decoder size (LUT) | 9570 | 15901 |

Table 2 shows the frame rate of the decoder. These results are the same for both general and specific implementation. The clock runs at 40 MHz, which is the maximum frequency that can be used for this application on the FPGA (speed grade -4).

TABLE 2

Achieved frame rate

|  | Software | Hardware |
|---|---|---|
| Frame rate (fps) | 6 | 23 |

When achieving 6 fps in software, the CPU load is about 95%. Moving the task to hardware reduces the computational load of the CPU, but increases the load generated by the communication. Indeed, the communication between the send thread and the decoder on the one side, and between the decoder and the receive thread on the other side, is heavily loading the processor. The communication between the iPAQ and the FPGA is performed using BlockRAM internal DPRAMs of the Xilinx Virtex FPGA. While the DPRAM can be accessed at about 20 MHz, the CPU memory access clock runs at 103 MHz. Since the CPU is using a synchronous RAM scheme to access these DPRAMs, wait-states have to be inserted.

During these wait-states, the CPU is prevented from doing anything else, which increases the CPU load. Therefore, the hardware performance is mainly limited by the speed of the CPU-FPGA interface. This results in the fact that for a performance of 23 fps in hardware, the CPU is also at 95% load. Although the OS4RS overhead for relocating the decoder from software to hardware is only about 100 μs, the total latency is about 108 ms. The low OS4RS overhead can be explained by the absence of a complex task placement algorithm. Most of the relocation latency is caused by the actual partial reconfiguration through the slow CPU-FPGA interface. In theory, the total software to hardware relocation latency can be reduced to about 11 ms, when performing the partial reconfiguration at full speed. When relocating a task from hardware to software, the total relocation latency is equal to the OS4RS overhead, since in this case no partial reconfiguration is required.

Figure 12:
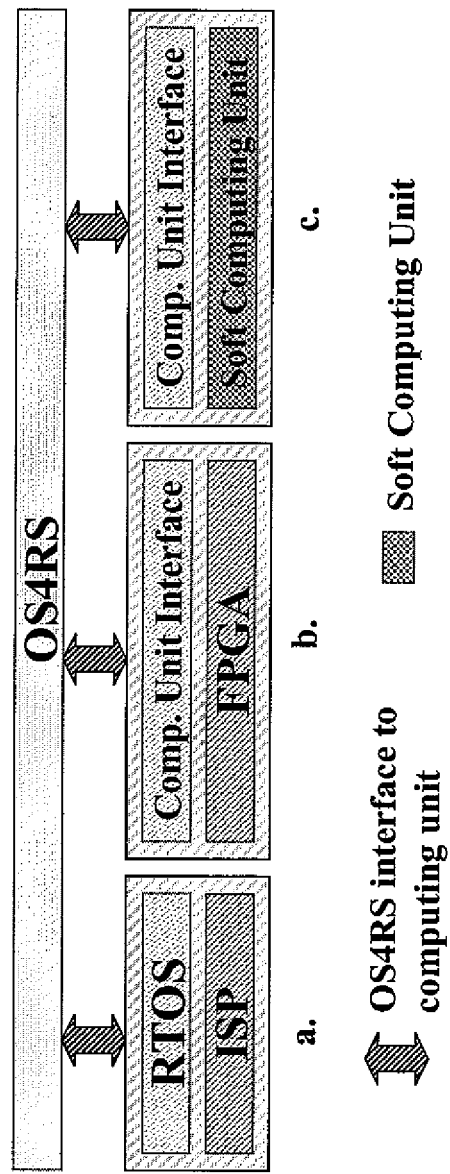
FIG. 12 is a representation of a block diagram of a further embodiment in accordance with the invention.

A further embodiment of the invention is shown in FIG. 12. The arrangement of FIG. 12 is a system, managed by OS4RS 1, that contains a) an ISP 6, b) a hardware reconfigurable device 8 such as an FPGA and c) a soft computing unit 10. The soft computing unit 10 will rely on a host computing unit (the ISP 6 or the FPGA 8) to execute OS4RS tasks. Each computing unit 10 has an interface layer 42 responsible for hiding its internal complexity from the OS4RS 1 by providing the required processor information structure functions. In case of an ISP 6, an RTOS layer 43 as interface layer is used, since it readily provides all necessary processor information structure functions.

Figure 13:
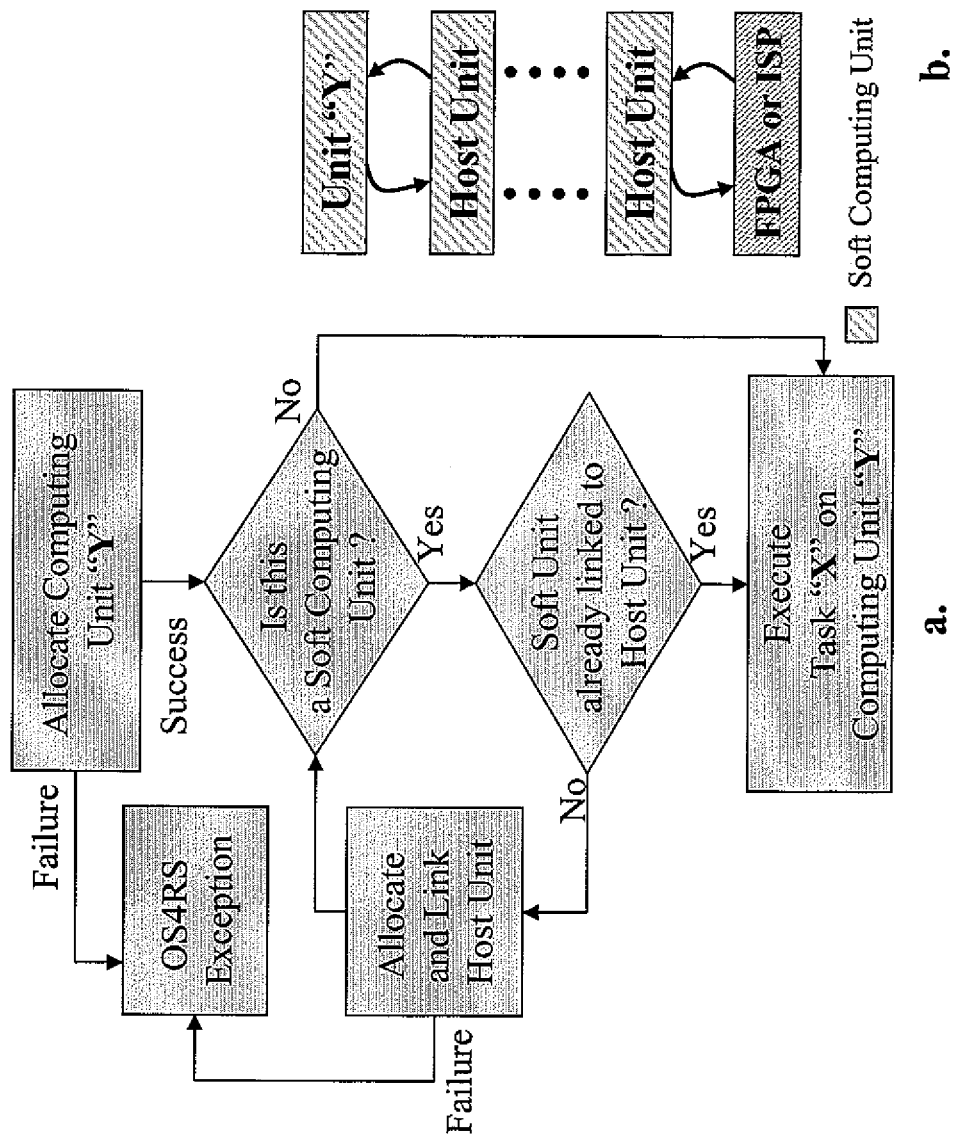
FIG. 13 shows a flow diagram of an algorithm to link different computing units in a hierarchical way in accordance with an embodiment of the invention.
Figure 14:
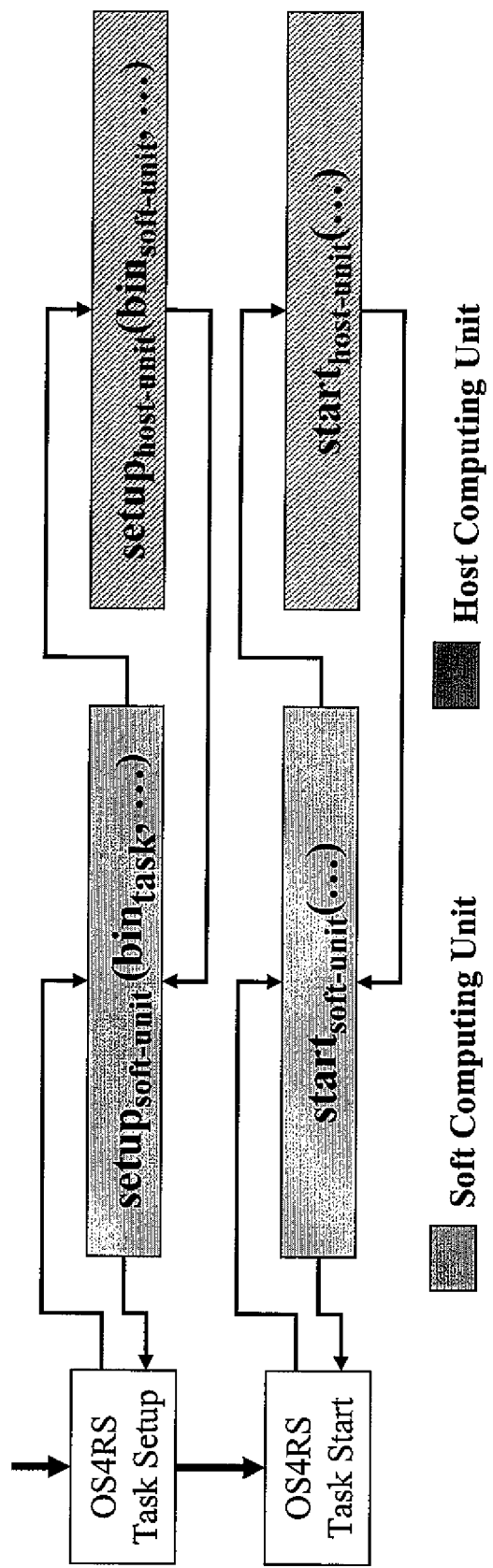
FIG. 14 shows setting up and starting a task in accordance with an embodiment of the invention.

FIG. 13 shows a method flow to link the different computing units in a hierarchical way. These actions are performed by the operating system, US 24RS when it needs to execute a task on a computing resource. In case the task is assigned to a software computing unit, the operating system needs to recursively allocate a suitable host computing unit and link both computing resources by means of their respective processor information;

FIG. 14 shows setting up 80 and starting 90 an OS4RS task as achieved by recursively setting up 82, 84 and starting 92, 94 every computing unit in the hierarchy. This is done by means of interface functions present in the processor information structure. It is the responsibility of the software computing unit to set an instance of itself on the host computing unit before execution of the assigned task. This is possible due to the fact that the processor structures form a hierarchically linked list (FIG. 13).

Figure 15A:
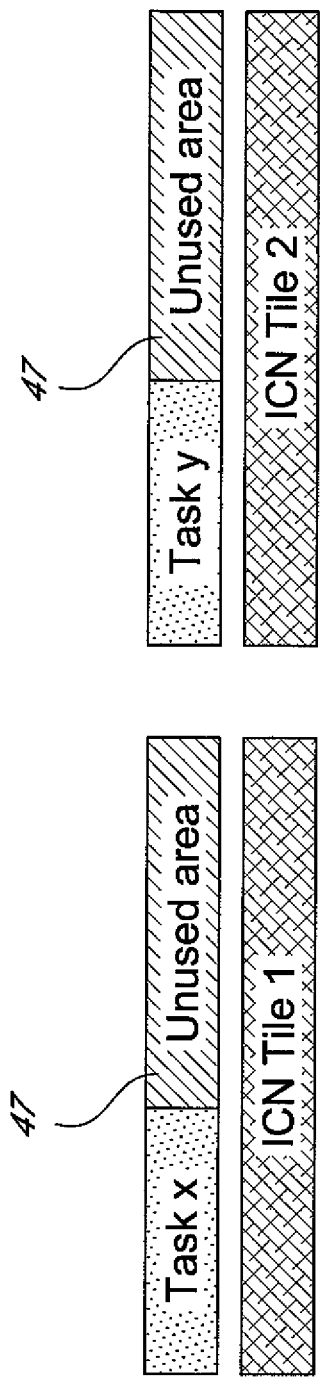
FIGS. 15a and 15b show how unused reconfigurable hardware device area can be better utilized in accordance with an embodiment of the invention.
Figure 15B:
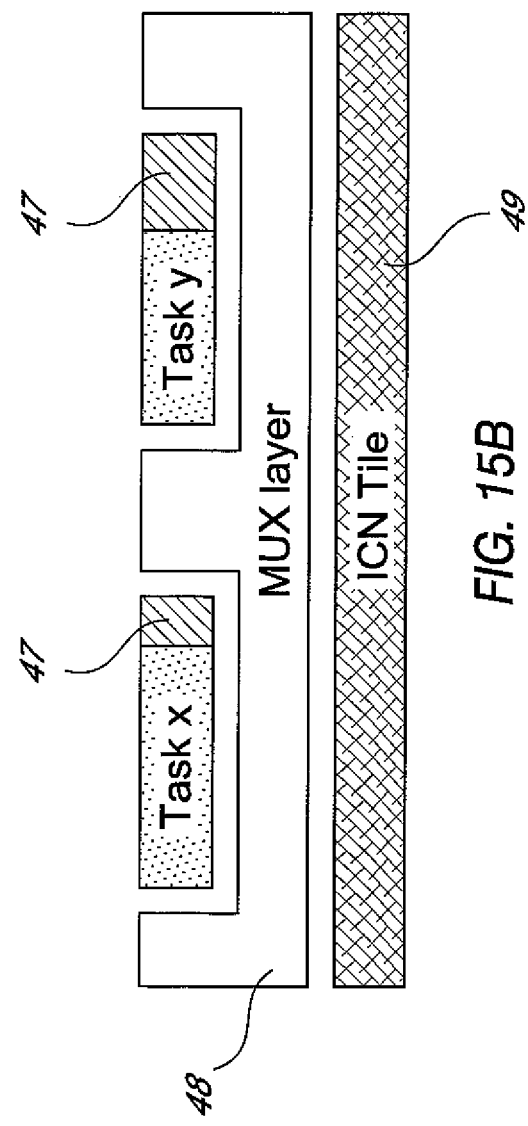

FIG. 15 demonstrates in (a) that 'Task x' and 'Task y' each allocate an ICN tile 45, 46, with a lot of unused reconfigurable hardware area 47 as a consequence. In FIG. 14 b it is shown that by using an additional abstraction layer 48, it is possible to reduce the amount of unused reconfigurable area 47 while using only a single ICN tile 49.

Since a reconfigurable hardware device such as an FPGA does not exhibit the same run-time flexibility as the Instruction Set Processor (ISP), e.g. when it comes to ease and speed of setting up a task, and in addition, FPGA's tend to be less suited than traditional ISP's to accommodate control-flow dominated tasks, one aspect of the invention provides a method and apparatus to alleviate some of these issues by using a reconfiguration hierarchy (e.g. placing and configuring an ASIP or coarse grain reconfigurable block into the FPGA).

Another aspect of the invention provides an operating system that transparently manages the complexity of hierarchical reconfiguration. In addition, one embodiment of the invention has the benefits of employing multiple hierarchical levels of configuration. In one aspect, the invention provides a filtering application on top of a microcontroller and a parameterizable filter block, both instantiated inside a reconfigurable hardware device such as an FPGA. The microcontroller can be a 16 bit microcontroller. At least one additional abstraction level on top of the computing resources (ISP or FPGA) is provided. Alone or combined, these abstraction levels form a reconfiguration hierarchy, transparently managed by an Operating System for Reconfigurable Systems.

This means, for example, that the OS4RS 1 is able to instantiate a virtual machine on top of an ISP or a softcore/coarse-grain block on top of an FPGA. The OS4RS's main duty is to divide the available computing resources among all executing tasks in an efficient and fair way. Therefore, the operating system will have to keep track of the available computing resources as well as the executing OS4RS tasks. The operating system manages its computing resources by linking a processor information structure to every (programmable) computing unit in the system (e.g. ISP).

It should be noted that it is also possible to register, for example, a softcore or a virtual machine as an OS4RS computing resource. This type of computing resource, further denoted as soft computing unit 10, provides the system with a new level of computing abstraction. A soft computing unit 10 requires a host computing unit in order to be able to execute an OS4RS task, e.g. softcore ASIP on top of an FPGA host or virtual machine on top of an ISP host. Every processor information structure contains a set of interface functions that completely describes the functionality of the computing resource. This means that for every registered resource, the OS4RS is able to instantiate/delete a task, suspend/resume a task, control inter-task communication and handle computing resource exceptions. The operating system is also able to monitor the state of the computing resource through a number of variables contained in its information structure. This mainly includes the load of the computing unit, the number of running tasks, the task setup time and a link to the host processor information structure in case of a soft computing unit. The operating system keeps track of the tasks by means of a task information structure list. Every OS4RS task instantiation is linked to such a task information structure.

As shown in FIG. 12, setting up and starting a task on any computing unit is done by means of the interface functions present in its processor information structure. Notice that it is the responsibility of the soft computing unit to setup an instance of itself on the host computing unit prior to execution of the assigned task. This is possible due to the fact that the processor information structures form a hierarchically linked list (FIG. 13). Naturally, if the required soft computing instance is already present, the task setup phase only requires to reconfigure the instance (e.g. applying new filter coefficients in case of a run-time configurable filter block). The reason for this hierarchical way of setting up and starting a task is that configuration is strongly dependent on the implementation of the soft computing unit (e.g. an ASIP will have to configure some program memory, while a coarse grain filter block only needs to configure the filter components).

Notice that two hierarchical levels of reconfiguration have been described, the operating system is not bound to that limitation. Indeed employing an operating system that is able to handle hierarchical (re)configuration opens up a wide range of possibilities, by allowing to place any kind of abstraction layer on top of another registered computing resource. This provides the benefits of hierarchical reconfiguration for the application designer, but also for the management of the run-time reconfigurable resources. By using an operating system for reconfigurable systems capable of handling hierarchical reconfiguration, one could use the following approaches.

In case the hardware tasks are significantly smaller than the reconfigurable tiles the designer can consider using or creating a second hierarchical network level by registering a special type of soft computing unit: a multiplexer block. This type of soft computing unit is in fact an extra abstraction layer that allows placing multiple small dedicated hardware tasks into one reconfigurable ICN tile. The main job of this multiplexer block, would be to perform, in association with the OS4RS, some kind of port masquerading: depending on the port number of an incoming data message, the message is dispatched to 'Task x' or 'Task y' (see FIG. 15).

In case a dedicated hardware task is too large, the designer can consider using a specialized soft computing unit (DSP or ASIP) to perform the task. This implies that a soft computing unit may prove to be useful for tasks that are quite complex and would require a very large state machine. In addition, the use of a microprocessor tends to be more efficient in case of control-intensive tasks. The only possible down-side, is that the soft computing unit might not live up to the performance or power requirements. Obviously, it is up to the designer to decide if these properties are considered important for the task or application under development.

Note that there are, essentially, two different techniques to deal with dynamic task relocation: the translation-based technique and the interpretation-based technique. The translation based technique is used when a task needs to be relocated between heterogeneous computing units (e.g. from an ICN tile to an ISP or vice versa). In this case, relocating a task first of all requires that the task binary is present for both computing unit types or that the operating system is able to perform a run-time translation. Secondly, in order to seamlessly continue task execution, the operating system needs to transfer the task state from one computing unit to another. If the task state is not kept in an application-dependent processor-independent form, then this technique also implies a translation of the task state by the OS4RS.

The interpretation based technique can be used in case the task is executing on a soft computing unit available for both types of host computing units involved in the dynamic task relocation. This, in fact, is the same as having the same virtual processor emulated on both the origin and target processor in the relocation process. Obviously, in this case there is no need to have multiple binary representations per task, which is quite important when dealing with limited storage devices (embedded architectures). Furthermore, transferring task state is quite straightforward, in contrast to the translation technique. The interpretation based technique would, for example, allows a task to be started on a Java Virtual Machine running on top of an ISP and then relocate it to a Java Processor Core, fitted into an ICN tile.

The benefits acquired by executing a task on a soft computing unit, like an ASIP or a coarse grain reconfigurable block, instead of using dedicated hardware configuration can be split into two categories: the design-time benefits and the run-time benefits. At run-time, the use of such a soft computing unit results in less inter-task interference, since the time needed to perform a run-time reconfiguration is considerably reduced. This reduced task setup time, in turn, makes multitasking on an ICN tile by means of temporal scheduling feasible. Finally, the amount of storage space (memory and disk space) needed to store a task binary can be reduced by at least an order of magnitude. The design time benefits of using this kind of soft computing unit can be summarized as follows: Faster development due to the widespread availability of software development tools and simulators. This makes it possible, for example, to use a software task while prototyping. Meanwhile a dedicated high performance hardware configuration can be developed with possible reuse of legacy code, which avoids going through a lengthy design and debug phase.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of dynamically reconfiguring a computing platform in a process for executing at least one application on the platform, the platform comprising a reconfigurable processing device, the method comprising:
   first-configuring the reconfigurable device so as to be capable of executing a first plurality of hardware tasks;
   after the first-configuring, executing a first set of tasks of an application substantially simultaneously on the platform, at least two of the first set of tasks being executed as hardware tasks on the reconfigurable device;
   interrupting the execution of the first set of tasks wherein the interruption occurs while executing a task;
   second-configuring the reconfigurable device such that at least one new hardware task other than one of the first plurality of hardware tasks can be executed; and
   executing a second set of tasks substantially simultaneously on the platform to further execute the application, wherein at least two of the second set of tasks include the at least one new hardware task and are executed as hardware tasks on the reconfigurable device, and wherein the execution of the second set of tasks includes the resumed execution of the interrupted task,
   wherein the application comprises a plurality of tasks, a number of the tasks being selectably executable as a software task on a programmable processor or as a hardware task on a hardware device;
wherein the reconfigurable device comprises a plurality of tiles, each tile being configurable in a variety of configurations, each of the tile configurations being capable of running a hardware task and wherein the second-configuring of the reconfigurable device changes at least one of the tiles from one configuration to another configuration; and
wherein the reconfigurable device comprises a communication network for providing communication between the tiles, and during the second-configuring of the reconfigurable device, the communication network remains fixed.

2. The method of claim 1, wherein the new hardware task is first executed on the programmable processor and thereafter, when the configuring is ready, executing the second set of the tasks, including the new task, substantially simultaneously on the platform, while at least two of the tasks of the second set, including the new task, are substantially simultaneously executed as hardware tasks on the reconfigurable device.

3. The method of claim 1, wherein a task is described in a description using a description language and being represented as a first set of objects with a first set of relationships therebetween.

4. The method of claim 3, further comprising transforming the description into a synthesizable code.

5. The method of claim 1, wherein the application is represented by codes, of which at least a first part is convertible in a first code, obtainable by mapping at least part of the application onto a virtual device which is hardware reconfigurable, further at least a second part of the code is convertible in a second code obtainable by mapping at least part of the application onto a virtual programmable processor, the first code comprising configuration information for hardware reconfiguring the virtual device, the hardware reconfiguring being required for enabling execution of the application on the virtual device, the second code comprising instructions compilable on a virtual programmable processor, and wherein the method further comprises:
transforming the first code into a third code, the third code comprising configuration information for hardware configuring the hardware reconfigurable device, the hardware reconfiguring being required for enabling execution of the application on the hardware reconfigurable device;
transforming the second code into a fourth code, the fourth code comprising instructions compilable on the programmable processor; and
executing on the device the application with the third and fourth code.

6. The method of claim 1, wherein the application is defined as a set of process threads in a description language, the set defining a representation of the application, at least part of the process thread representing a process which can be carried out on either the reconfigurable hardware device or the programmable processor, the description language including a function that suspends a thread, and wherein the method further comprises suspending at least one thread and storing the state information of the thread by invoking the function.

7. A system comprising:
a reconfigurable device;
a programmable processor configured to communicate with the reconfigurable device; and
an operating system of a computing platform, configured to execute on the programmable processor and capable of managing the execution of at least one application that includes a plurality of tasks, the operating system comprising:
a scheduler configured to schedule the tasks; and
a reconfiguring section configured to reconfigure at runtime resources for a hardware task executed on the reconfigurable device,
wherein the operating system is adapted for operating with a platform with a reconfigurable device, comprising a plurality of tiles, each tile being configurable in a variety of configurations, each of the tile configurations being capable of running a hardware component, and wherein the system further comprises means for storing the usage of tiles by the hardware components at any moment;
wherein a number of the tasks are selectably executable as a software task on the programmable processor or as a hardware task on a hardware device, on the computing platform comprising at least one programmable processor and the reconfigurable device;
wherein the reconfigured tasks are not required to be rerouted to a different resource.

8. The system of claim 7, wherein the operating system is further configured to allocate resources between the programmable processor and the reconfigurable device.

9. The system of claim 7, wherein the operating system is further configured to pre-empt and relocate tasks between the programmable processor and the reconfigurable device and vice versa.

10. The system of claim 7, wherein the operating system is further configured to store state information for a task, executed as a hardware component, when preempted on the reconfigurable device.

11. The system of claim 7, wherein the tasks of the operating system are capable of moving to a preemption state when receiving a pre-emption request, further comprising, when the preemption state is reached for a task, means for sending a message containing the current state of that task.

12. The system of claim 7, wherein the operating system is further configured to restore state information on the reconfigurable device, when the corresponding task's execution is re-started.

13. The system of claim 7, wherein the operating system is further configured to invoke hard real time constraints on a task executed as a software task.

14. The system of claim 7, wherein the operating system is further configured for uniform communication, wherein tasks send and/or receive messages regardless of whether they are executed as hardware or as software tasks.

15. The system of claim 14 wherein the operating system is adapted for handling logical addresses as representations of the tasks, and wherein the means for supporting uniform communication comprises means for updating address translation tables, enabling translation of the logical addresses into physical addresses, and representing the location of a task within the reconfigurable device.

16. The system of claim 7, wherein the reconfigurable device comprises a plurality of tiles, each tile being configurable in a variety of configurations, each of the tile configurations being capable of running a hardware component, and wherein the operating system further comprises means for deciding on which tile a hardware task is executed.

17. The system of claim 16 wherein the operating system is further configured for adapting the configurations of the tiles by performing a partial reconfiguration of the reconfigurable device without rerouting.

18. The system of claim 7, wherein the reconfigurable device comprises a plurality of tiles and a communication network for providing communication between the tiles, and wherein the system further comprises means for message routing over the communication network by providing routing tables.

19. The system of claim 7, wherein the operating system is adapted for execution on the programmable processor in real-time mode.

20. The system of claim 7, wherein the operating system comprises:
a piece of middleware software, the middle software comprising: means for communicating with the operating system, and means for performing the selection of whether a task will be selected as software or as hardware component.

21. The system of claim 20, wherein the middleware software further comprises means for handling a representation of the application as a set of communicating threads.

22. The system of claim 21, wherein the middleware software further comprises means for automatic code generation for a task either as hardware component or as software component.

23. The system of claim 7, wherein the operating system comprises:
a device driver, dedicated for the reconfigurable device, configured to have a plurality of tiles, comprising means for communicating with the operating system, the means for communicating providing the operating system with information about the number of tiles and the speed of reconfigurability of the reconfigurable device.

24. The system of claim 7, wherein the operating system comprises:
a piece of middleware software configured to communicate with the operating system, and to perform the selection of whether a task will be selected as software or as hardware component.

25. A method of dynamically reconfiguring a computing platform that includes a reconfigurable processing device, the method comprising:
configuring the reconfigurable device so as to be capable of executing a first plurality of hardware tasks;
multi-tasking a first set of tasks of an application on the platform, wherein at least two of the first set of tasks are hardware tasks being concurrently executed on the reconfigurable device;
interrupting the execution of the first set of tasks;
configuring the reconfigurable device such that at least one new hardware task other than one of the first plurality of hardware tasks can be executed; and
multi-tasking a second set of tasks on the platform to further execute the application, wherein at least two of the second set of tasks are hardware tasks being concurrently executed on the reconfigurable device, and include the at least one new hardware task,
wherein the application comprises a plurality of tasks, a number of the tasks being selectably executable as a software task on a programmable processor or as a hardware task on a hardware device;
wherein the reconfigurable device comprises a plurality of tiles, each tile being configurable in a variety of configurations, each of the tile configurations being capable of running a hardware task and wherein the configuring of the reconfigurable device with the one new hardware task changes at least one of the tiles from one configuration to another configuration; and
wherein the reconfigurable device comprises a communication network for providing communication between the tiles, and during the configuring of the reconfigurable device with the one new hardware task, the communication network remains fixed.

26. A system for dynamically reconfiguring a computing platform, wherein the computing platform is configured to execute at least one application, and the platform comprises a reconfigurable processing device, the system comprising:
means for configuring the reconfigurable device so as to be capable of executing a first plurality of hardware tasks;
means for, after the configuring, executing a first set of tasks of an application substantially simultaneously on the platform, at least two of the first set of tasks being executed as hardware tasks on the reconfigurable device;
means for interrupting the execution of the first set of tasks;
means for configuring the reconfigurable device such that at least one new hardware task other than one of the first plurality of hardware tasks can be executed; and
means for executing a second set of tasks substantially simultaneously on the platform to further execute the application, at least two of the second set of tasks including the at least one new hardware task and being executed as hardware tasks on the reconfigurable device,
wherein the application comprises a plurality of tasks, a number of the tasks being selectably executable as a software task on a programmable processor or as a hardware task on a hardware device;
wherein the reconfigurable device comprises a plurality of tiles, each tile being configurable in a variety of configurations, each of the tile configurations being capable of running a hardware task and wherein the configuring of the reconfigurable device such that at least one new hardware task can be executed changes at least one of the tiles from one configuration to another configuration; and
wherein the interruption of the first set of tasks comprises, pre-empting the interrupted task and storing its associated state information for a task,
restoring associated state information on the reconfigurable device when the interrupted task's execution is resumed.

27. The method of claim 26, wherein the interrupted task's execution is associated with one of the hardware tiles, and wherein the interrupted task is resumed to either the same hardware tile as before the interruption or else resumed on a different hardware tile.

28. A non-transitory computer readable medium storing an operating system, that when executed performs a method comprising:
configuring the reconfigurable device so as to be capable of executing a first plurality of hardware tasks;
multi-tasking a first set of tasks of an application on the platform, wherein at least two of the first set of tasks are hardware tasks being concurrently executed on the reconfigurable device;
interrupting the execution of the first set of tasks;
configuring the reconfigurable device such that at least one new hardware task other than one of the first plurality of hardware tasks can be executed; and
multi-tasking a second set of tasks on the platform to further execute the application, wherein at least two of the second set of tasks are hardware tasks being concurrently executed on the reconfigurable device, and include the at least one new hardware task,
wherein the application comprises a plurality of tasks, a number of the tasks being selectably executable as a software task on a programmable processor or as a hardware task on a hardware device;

wherein the reconfigurable device comprises a plurality of tiles, each tile being configurable in a variety of configurations, each of the tile configurations being capable of running a hardware task and wherein the configuring of the reconfigurable device with the one new hardware task changes at least one of the tiles from one configuration to another configuration; and wherein the reconfigurable device comprises a communication network for providing communication between the tiles, and during the configuring of the reconfigurable device with the one new hardware task, the communication network remains fixed.

\* \* \* \* \*